US012215185B2

(12) United States Patent
Singh et al.

(10) Patent No.: US 12,215,185 B2
(45) Date of Patent: Feb. 4, 2025

(54) RECYCLABLE AND REWORKABLE EPOXY RESINS

(71) Applicant: ADITYA BIRLA CHEMICALS (THAILAND) LTD. (EPOXY DIVISION), Bangkok (TH)

(72) Inventors: Chandan Kumar Singh, Rayong (TH); Pradip Kumar Dubey, Rayong (TH); Weerawat Sripet, Rayong (TH); Kanyarat Sittipummongkol, Rayong (TH)

(73) Assignee: ADITYA BIRLA CHEMICALS (THAILAND) LTD. (EPOXY DIVISION), Bangkok (TH)

( * ) Notice: Subject to any disclaimer, the term of this patent is extended or adjusted under 35 U.S.C. 154(b) by 758 days.

(21) Appl. No.: 17/392,907

(22) Filed: Aug. 3, 2021

(65) Prior Publication Data

US 2021/0363287 A1 Nov. 25, 2021

Related U.S. Application Data

(63) Continuation of application No. PCT/IB2019/060653, filed on Dec. 11, 2019.

(30) Foreign Application Priority Data

Feb. 4, 2019 (IN) .............................. 201911004247

(51) Int. Cl.
| | |
|---|---|
| *C08G 59/02* | (2006.01) |
| *C08G 59/06* | (2006.01) |
| *C08G 59/24* | (2006.01) |
| *C08G 59/30* | (2006.01) |
| *C08G 59/32* | (2006.01) |
| *C08G 59/50* | (2006.01) |
| *C08G 59/68* | (2006.01) |
| *C08J 11/26* | (2006.01) |
| *C08J 11/28* | (2006.01) |
| *C08L 63/00* | (2006.01) |

(52) U.S. Cl.
CPC ......... *C08G 59/245* (2013.01); *C08G 59/063* (2013.01); *C08G 59/306* (2013.01); *C08G 59/3218* (2013.01); *C08G 59/3227* (2013.01); *C08G 59/3281* (2013.01); *C08G 59/5026* (2013.01); *C08G 59/687* (2013.01); *C08J 11/26* (2013.01); *C08J 11/28* (2013.01); *C08J 2363/00* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 5,512,613 A | 4/1996 | Afzali-Ardakani et al. | |
| 5,932,682 A | 8/1999 | Buchwalter et al. | |
| 6,887,737 B1 | 5/2005 | Woods et al. | |
| 2013/0245204 A1* | 9/2013 | Pastine | C08L 63/00 568/62 |
| 2019/0016870 A1* | 1/2019 | Kosinski | C07F 7/04 |

FOREIGN PATENT DOCUMENTS

| | | |
|---|---|---|
| WO | WO-9204392 A1 | 3/1992 |
| WO | WO-0228849 A1 | 4/2002 |
| WO | WO-2009070172 A1 | 6/2009 |
| WO | WO-2012071896 A1 | 6/2012 |

OTHER PUBLICATIONS

International Search Report for International Application No. PCT/IB2019/060653, dated Mar. 2, 2020.
Written Opinion for International Application No. PCT/IB2019/060653, dated Mar. 2, 2020.
Degradable and Chemically Recyclable Epoxy Resins Containing Acetal Linkages: Synthesis, Properties, and Application for Carbon Fiber-Reinforced Plastics, Hashimoto et al., Jouranl of Polymer Science Part A: Polymer Chemistry 2012, DOI: 10.1002/pola.26160, www.polychemistry.org, accepted Apr. 24, 2012.
Recyclable Carbon Fiber-Reinforced Plastics (CFRP) Containing Degradable Acetal Linkages: Synthesis, Properties, and Chemical Recycling, Yamaguchi, et al., Journal of Polymer Science, Part A: Polymer Chemistry, www.polymerchemistry.org, DOI: 10.1002/pola.27575, published online Mar. 3, 2015.
Examination Report issued to Application No. 201911004247 issued to India, dated Feb. 9, 2021.

\* cited by examiner

*Primary Examiner* — Michael J Feely
(74) *Attorney, Agent, or Firm* — MARSHALL, GERSTEIN & BORUN LLP; Michael P. Furmanek

(57) ABSTRACT

An epoxy resin component(s) for a recyclable epoxy resin system is disclosed. The recyclable epoxy resin system comprises an epoxy resin component having a structural Formula I or an epoxy resin component having a structural Formula II and a curing agent. A process(es) for preparing the epoxy resin component having the structural Formula I and the epoxy resin system having the structural Formula II is also disclosed.

11 Claims, No Drawings

RECYCLABLE AND REWORKABLE EPOXY RESINS

CROSS-REFERENCE TO RELATED APPLICATIONS

This is a Continuation of International Patent Application No. PCT/IB2019/060653, filed Dec. 11, 2019, which claims priority to India patent application No. 201911004247, filed Feb. 4, 2019. The entire contents of each of the foregoing applications being hereby incorporated herein by reference.

FIELD OF THE INVENTION

The present disclosure relates to an epoxy resin(s) and a process for production of the epoxy resin(s). Specifically, the disclosure relates to a recyclable and reworkable epoxy resin(s).

BACKGROUND

Epoxy resins are class of thermoset materials used extensively in diverse applications like performance materials, structural materials, aerospace composites, automobile composites, wind mill composites, adhesives, paints, coatings, electrical, electronics, printed circuit boards PCBs, moulding, potting and other specialty composites applications. Epoxy resins offer superior mechanical and thermal properties such as high strength, high chemical and solvent resistance, low shrinkage, excellent adhesion to varying substrates, economical with low toxicity.

For high performance, epoxy resins are used with curing agents such as aliphatic amines, alicyclic polyamines, aromatic amines, UV curing agents and a combination thereof. In addition, various reinforcement materials such as glass fiber, carbon fiber, natural fiber, other synthetic fiber or custom structures are also often added to these epoxy resins to form a matrix of the epoxy resins with the reinforcement material.

However, due to high strength, irreversible curing process, mechanical strength, and very high heat and chemical resistance it is difficult to disintegrate, remove or recycle the components of the cured epoxy resin systems. Moreover, at the end of the life cycle this become a challenging problem to recover and reuse the valuable components of the epoxy resin system. Generally, all the components of the epoxy resins are disposed and lost through incineration and landfilling. These methods of disposal cause irreversible damages and contaminations to environment.

Another challenge faced in the epoxy industry is that corrections and adjustments are not possible in cases where resins, curing agents or other components are selected wrongly, or used in wrong composition or gets spilled during the curing process. Therefore, there is a need to achieve reworkable and recyclable epoxy resin system, so that all the valuable components of the epoxy resin system can be recovered and recycled when desired.

To date, several recycling methods and reworkable epoxy resins have been brought forward to obtain reworkable and recyclable epoxy resins. Previous other attempts and development of reworkable epoxy resin systems utilizes high temperatures, special solvents, press molding, additional monomer, special processing and/or metal catalysts. These treatments convert the rigid networks into viscoelastic liquids for recycling/reprocessing. However, these treatments have a significant limitation as they involve exposing the polymeric matrix to a very high temperature and high pressure, and additional ingredients such as a metal catalyst or additional monomers are required. Additionally, these methods are uneconomical and inefficient, because many of the components may not be fully recovered or are damaged during high temperature disintegration process.

Therefore, there is a need for an epoxy resin component, a recyclable epoxy resin system containing the epoxy resin component which have reworkable and recyclable properties.

SUMMARY OF THE INVENTION

The present disclosure relates to an epoxy resin component(s) for a recyclable epoxy resin system. The epoxy resin component having a structural Formula I or a structural Formula II:

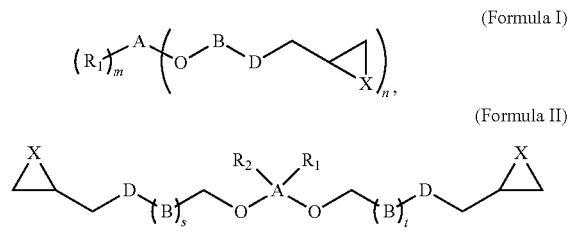

wherein
m=0 then n=4,
m=1 then n=3,
m=2 then n=2,
A is carbon or silicon,
D is oxygen or nitrogen or carboxylic group,
X is oxygen or sulfur,
s and t is independently from 1 to 20,
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

A process for preparing an epoxy resin component having a structural Formula I and an epoxy resin component having a structural Formula II for an epoxy resin system is also disclosed. The process comprises partially epoxidizing a polyhydric alcohol having one or more hydroxyl group with an epihalohydrin in the presence of a base to obtain a partially epoxidized alcohol; and reacting the partially epoxidized alcohol with a compound having a structural Formula III, a compound having a structural Formula IV or a compound having a structural Formula V in the presence of an acidic catalyst to obtain the epoxy resin component having the structural Formula I and the epoxy resin component having the structural Formula II, wherein
the compound having the structural Formula III is represented by:

(Formula III)

$$\underset{R_1}{\overset{O}{\underset{\|}{C}}}R_2,$$

wherein $R_1$ and $R_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula IV is represented by:

(Formula IV)

$$R_3 \overset{R_2}{\underset{R_4}{-}} O - R_1,$$

wherein $R_1$ is independently hydrogen, alkyl, aryl, aralkyl, alkenyl, alkynyl;

$R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy;

the compound having the structural Formula V is represented by:

(Formula V)

$$R_3 \overset{R_1}{\underset{R_4}{\overset{|}{Si}}} R_2,$$

wherein
$R_1$, $R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, wherein the epoxy resin component having the structural Formula I and the structural Formula II is:

(Formula I)

$$\left( R_1 \right)_m \overset{A}{\diagup} \left( O \diagdown B \diagdown D \diagdown \triangle \right)_n, \text{ and}$$

(Formula II)

$$\overset{X}{\triangle} \diagdown D \diagdown (B)_s \diagdown O \diagdown \overset{R_2}{\underset{}{A}} \overset{R_1}{\diagdown} O \diagdown (B)_t \diagdown D \diagdown \overset{X}{\triangle}, \text{ respectively.}$$

wherein
m=0 then n=4,
m=1 then n=3,
m=2 then n=2,
A is carbon or silicon,
D is oxygen or nitrogen or carboxylic group,
X is oxygen or sulfur,
s and t is independently from 1 to 20,
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

An alternate process of preparing an epoxy resin component having a structural Formula I and an epoxy resin component having a structural Formula II for an epoxy resin system is also disclosed. The process comprises partially epoxidizing a compound having a structural Formula VI or a compound having a structural Formula VII with a percarboxylic acid or hydrogen peroxide to obtain a partially epoxidized alcohol; and reacting the partially epoxidized alcohol with a compound having a structural Formula III, a compound having a structural Formula IV or a compound having a structural Formula V in the presence of an acidic catalyst to obtain the epoxy resin component having the structural Formula I and the epoxy resin component having the structural Formula II, wherein the compound having the structural Formula VI is represented by:

$$\underset{R_3}{\overset{R_1}{\diagdown}}C=C\underset{R_4}{\overset{R_2}{\diagup}}$$ (Formula VI)

wherein $R_1, R_2, R_3, R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, aryl hydroxide, alkyl hydroxide, the compound having the structural Formula VII is represented by:

$$R_1-\underset{R_2}{\overset{R_3}{\underset{|}{C}}}\!\!\!\!\!-_n$$ (Formula VII)

wherein $R_1$ and $R_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, alkyl hydroxide, the compound having the structural Formula III is represented by:

$$\underset{R_1}{\overset{O}{\overset{\|}{C}}}R_2,$$ (Formula III)

wherein $R_1$ and $R_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula IV is represented by:

$$R_3-\underset{R_4}{\overset{R_2}{\underset{|}{\overset{|}{C}}}}\!\!\!\!-O-R_1,$$ (Formula IV)

wherein $R_1$ is independently hydrogen, alkyl, aryl, aralkyl, alkenyl, alkynyl;

$R_2, R_3, R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula V is represented by:

$$\underset{R_3\ \ R_4}{\overset{R_1\diagdown\ \diagup R_2}{Si}};$$ (Formula V)

wherein $R_1, R_2, R_3, R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, wherein the epoxy resin component having the structural Formula I and the structural Formula II is:

$$\left(R_1\right)_m\!\!\!\overset{A}{\diagup}\!\!\left(O\!\!-\!\!\overset{B}{\diagup}\!\!-D\!\!-\!\!\overset{\triangle}{\diagup}\right)\!\!\!X_n,\text{ and}$$ (Formula I)

$$\overset{X}{\triangle}\!\!-\!\!\overset{D}{\diagup}\!\!\overset{B}{\diagup}_s\!\!-\!\!O\!\!-\!\!\overset{R_2\ R_1}{\underset{A}{\diagup}}\!\!-\!\!O\!\!-\!\!\overset{B}{\diagup}_t\!\!\overset{D}{\diagup}\!\!-\!\!\overset{X}{\triangle},$$ (Formula II)

respectively.

wherein m=0 then n=4, m=1 then n=3, m=2 then n=2,

A is carbon or silicon,

D is oxygen or nitrogen or carboxylic group,

X is oxygen or sulfur, s and t is independently from 1 to 20, $R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl, B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

The present disclosure also provides an alternate process of preparing an epoxy resin component having a structural Formula I and an epoxy resin component having a structural Formula II for an epoxy resin system. The process comprises reacting an amino alcohol with an acid compound to form an amino alcohol salt, reacting the amino alcohol salt with a compound having a structural Formula III, a compound having a structural Formula IV or a compound having a structural Formula V in the presence of an acidic catalyst to obtain an intermediate compound, reacting the obtained intermediate compound with a base to obtain an amino compound; and epoxidizing the amino compound with an epihalohydrin in the presence of a base to obtain the epoxy resin component having the structural Formula I and the epoxy resin component having the structural Formula II, wherein, the compound having the structural Formula III is represented by:

(Formula III)

$$\underset{R_1}{\overset{O}{\|}}\underset{R_2}{\|}$$

wherein $R_1$ and $R_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula IV is represented by:

(Formula IV)

$$R_3 - \underset{R_4}{\overset{R_2}{|}} - O - R_1,$$

wherein $R_1$ is independently hydrogen, alkyl, aryl, aralkyl, alkenyl, alkynyl;

$R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula V is represented by:

(Formula V)

$$R_1\underset{R_3\ R_4}{\overset{R_2}{\underset{|}{\text{Si}}}};$$

wherein $R_1$, $R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, Alkoxy, alkoxyaryl, Alkoxy alkyl, aryloxy, wherein the epoxy resin component having the structural Formula I and the structural Formula II is (Formula I)

$$\left( R_1 \underset{m}{\overset{A}{\|}} \left( O \underset{}{\overset{B}{\|}} D \underset{X}{\overset{}{\triangle}} \right)_n \right), \text{ and}$$

(Formula II)

$$\underset{}{\overset{X}{\triangle}} D \left( B \right)_s O \underset{}{\overset{X}{\|}} \underset{A}{\overset{R_2}{\|}} O \left( B \right)_t D \underset{}{\overset{X}{\triangle}},$$

respectively.

wherein m=0 then n=4,
m=1 then n=3,
m=2 then n=2,
A is carbon or silicon,
D is oxygen or nitrogen or carboxylic group,
X is oxygen or sulfur,
s and t is independently from 1 to 20,
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

The present disclosure also concerns an epoxy resin system. An epoxy resin system comprising a curing agent; and an epoxy resin component having a structural Formula I or an epoxy resin component having a structural Formula II; wherein the epoxy resin component having the structural Formula I and the structural Formula II is:

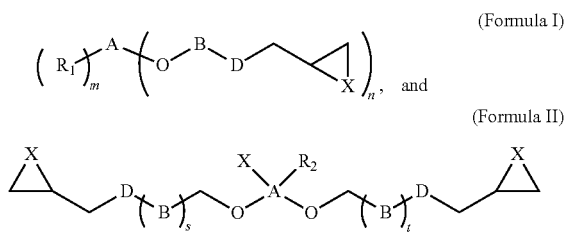

wherein
m=0 then n=4,
m=1 then n=3,
m=2 then n=2,
A is carbon or silicon,
D is oxygen or nitrogen or carboxylic group;
X is oxygen or sulfur,
s and t is independently from 1 to 20
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl;
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

The present disclosure further concerns a process for recycling an epoxy resin system. The process comprises heating the epoxy resin system; and immersing the heated epoxy resin system in an acid and a solvent at a temperature in a range of 50 to 150° C. The recyclable epoxy resin system being a reaction product of an epoxy resin component having a structural Formula I or an epoxy resin component having a structural Formula II and a curing agent.

DETAILED DESCRIPTION OF THE INVENTION

For the purpose of promoting an understanding of the principles of the invention, reference will now be made to embodiments and specific language will be used to describe the same. It will nevertheless be understood that no limitation of the scope of the invention is thereby intended, such alterations and further modifications in the disclosed process, and such further applications of the principles of the invention therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

In one aspect, the present disclosure provides an epoxy resin component for an epoxy resin system. Specifically, the present disclosure provides the epoxy resin component for a recyclable epoxy resin system.

The term "recyclable epoxy resin system" in context of the present disclosure means a system which is capable of softening in the mixture of heat, an acid and a solvent, which result in the dissolution of the epoxy resin component (s). The epoxy resin component (s) is capable of dissolution in these conditions because the cross-links in the epoxy matrix is acid labile and undergo a bond cleavage reaction. The cross-linked epoxy resin component is transformed into individual epoxy polymers, which are soluble in organic solvents.

The epoxy resin component for the recyclable epoxy resin system has a structural Formula I or a structural Formula II.

In accordance with an embodiment, the epoxy resin component having the structural Formula I is represented by:

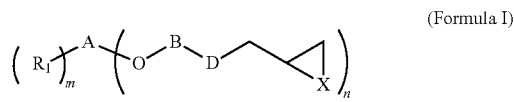

wherein
m=0 then n=4,
m=1 then n=3,
m=2 then n=2,

A is carbon or silicon,
D is oxygen, nitrogen or carboxylic group,
X is oxygen or sulfur;
$R_1$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl;
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

In accordance with an embodiment, the epoxy resin component having the structural Formula I, is one of the following compounds:

TABLE 1

| S. No. | Compounds of structural Formula I |
| --- | --- |
| ERC-1 | |
| ERC-2 | |
| ERC-3 | |
| ERC-4 | |

TABLE 1-continued

| S. No. | Compounds of structural Formula I |
|---|---|
| ERC-5 | (structure) |
| ERC-6 | (structure) |
| ERC-7 | (structure) |
| ERC-8 | (structure) |
| ERC-9 | (structure) |
| ERC-10 | (structure) |
| ERC-11 | (structure) |

TABLE 1-continued
| S. No. | Compounds of structural Formula I |
|---|---|
| ERC-12 | 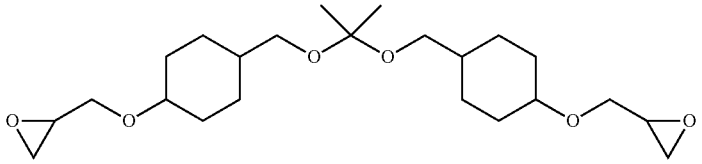 [SMILES: CC(C)(OCC1CCC(OCC2CO2)CC1)OCC1CCC(OCC2CO2)CC1] |
| ERC-13 | 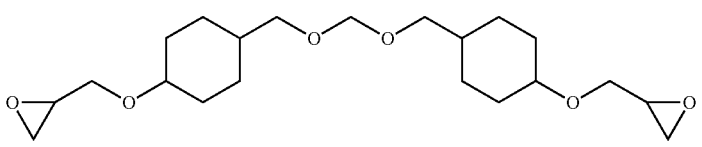 [SMILES: C(OCC1CCC(OCC2CO2)CC1)OCC1CCC(OCC2CO2)CC1] |
| ERC-14 | 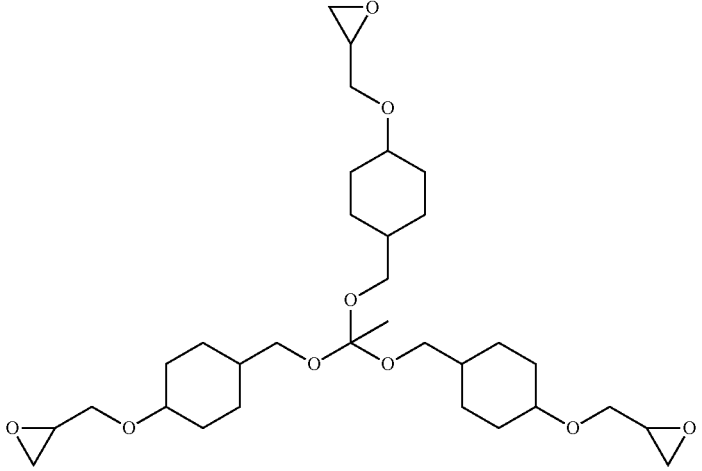 [SMILES: CC(OCC1CCC(OCC2CO2)CC1)(OCC1CCC(OCC2CO2)CC1)OCC1CCC(OCC2CO2)CC1] |
| ERC-15 | 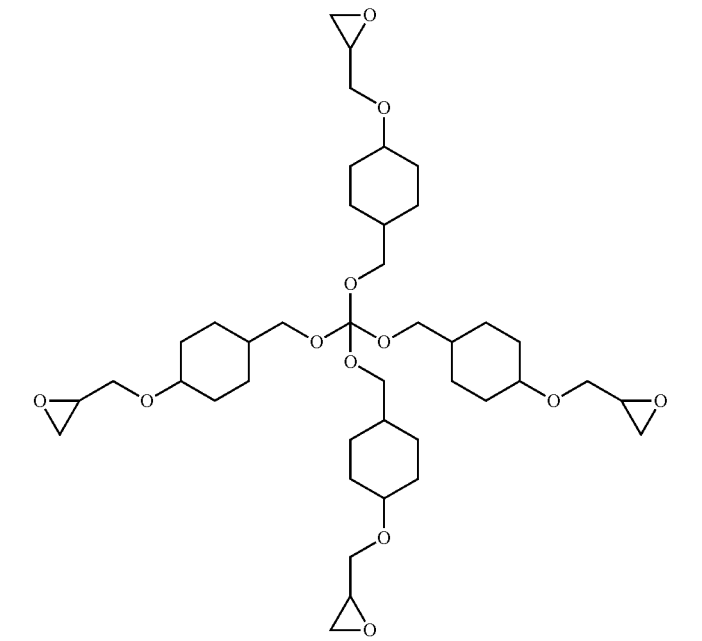 [SMILES: C1CC(OCC2CO2)CCC1COC(OCC1CCC(OCC2CO2)CC1)(OCC1CCC(OCC2CO2)CC1)OCC1CCC(OCC2CO2)CC1] |

TABLE 1-continued
| S. No. | Compounds of structural Formula I |
|---|---|
| ERC-16 | 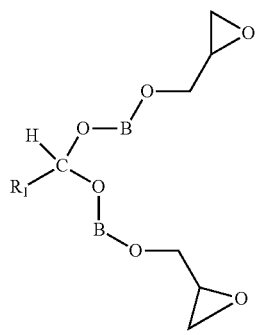 |
| ERC-17 | 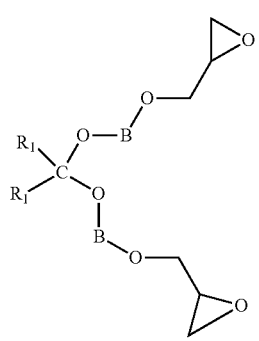 |
| ERC-18 | 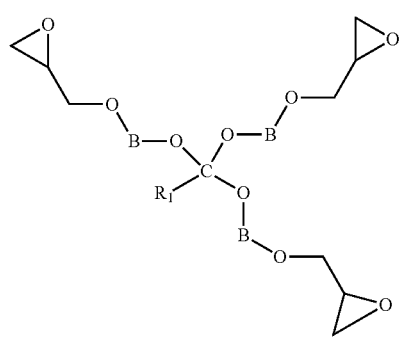 |
| ERC-19 | 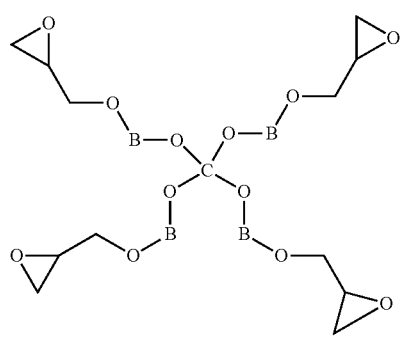 |

TABLE 1-continued
| S. No. | Compounds of structural Formula I |
|---|---|
| ERC-20 | 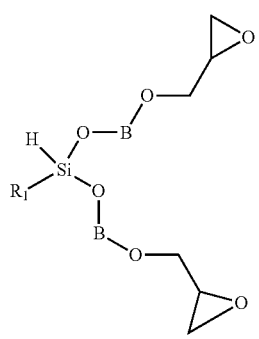 |
| ERC-21 | 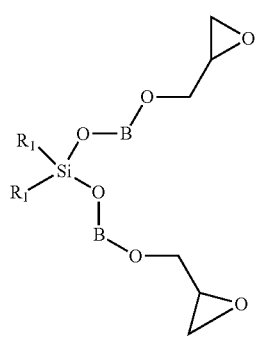 |
| ERC-22 | 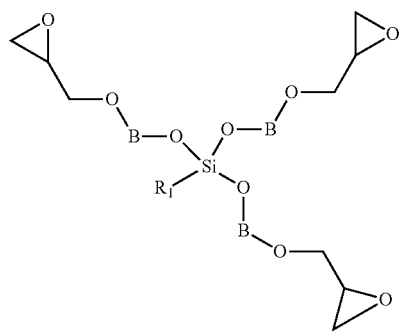 |
| ERC-23 | 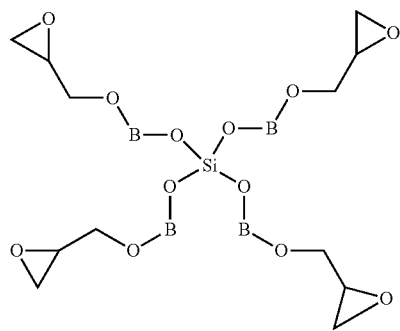 |
| ERC-24 | 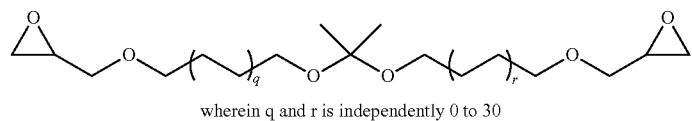<br>wherein q and r is independently 0 to 30 |
| ERC-25 | 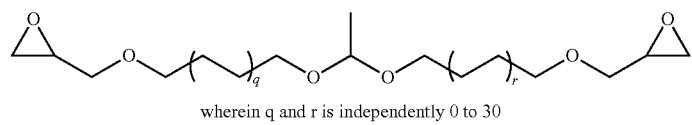<br>wherein q and r is independently 0 to 30 |

TABLE 1-continued
| S. No. | Compounds of structural Formula I |
|---|---|
| ERC-26 | 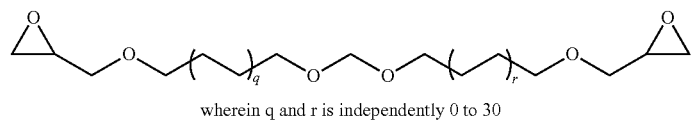<br>wherein q and r is independently 0 to 30 |
| ERC-27 | 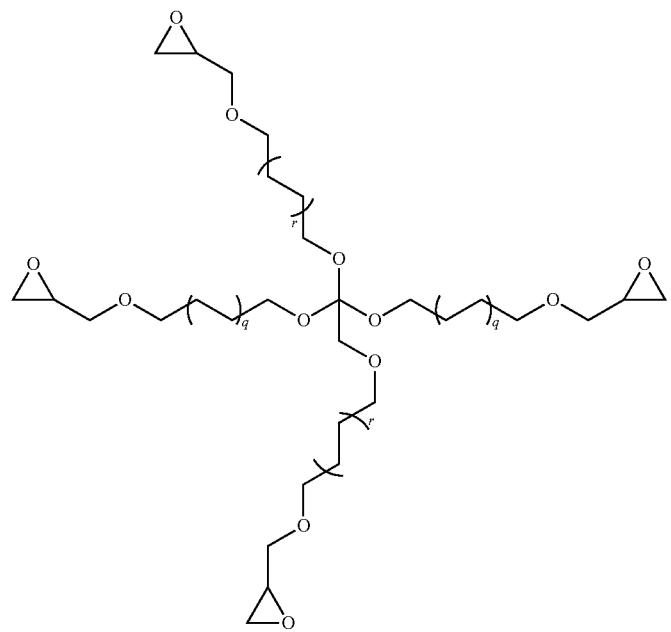<br>wherein q and r is independently 0 to 30 |
| ERC-28 | 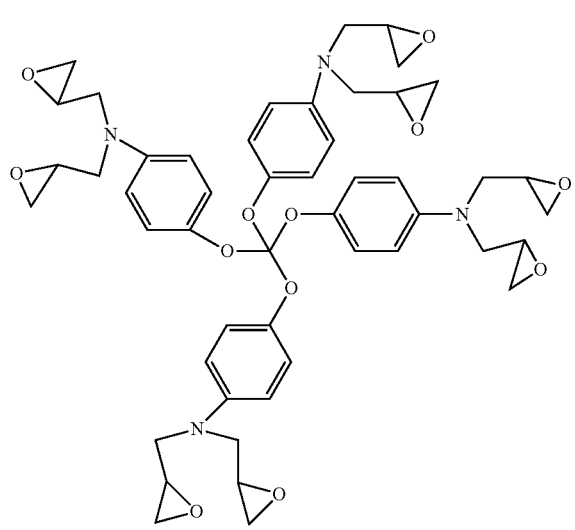 [SMILES: c1cc(N(CC2CO2)CC2CO2)ccc1OC(Oc1ccc(N(CC2CO2)CC2CO2)cc1)(Oc1ccc(N(CC2CO2)CC2CO2)cc1)Oc1ccc(N(CC2CO2)CC2CO2)cc1] |
| ERC-29 | 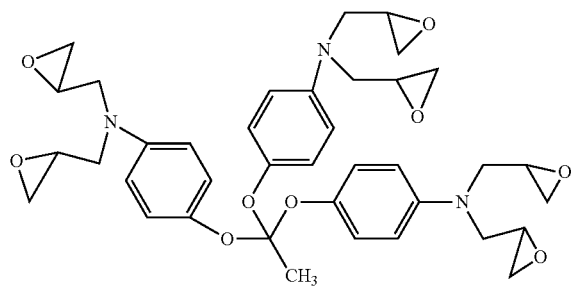 [SMILES: CC(Oc1ccc(N(CC2CO2)CC2CO2)cc1)(Oc1ccc(N(CC2CO2)CC2CO2)cc1)Oc1ccc(N(CC2CO2)CC2CO2)cc1] |

TABLE 1-continued
| S. No. | Compounds of structural Formula I |
|---|---|
| ERC-30 | 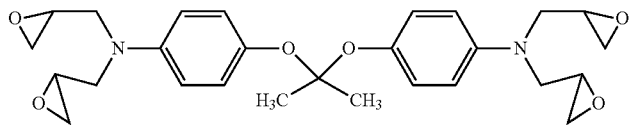 [SMILES: CC(C)(Oc1ccc(N(CC2CO2)CC2CO2)cc1)Oc1ccc(N(CC2CO2)CC2CO2)cc1] |
| ERC-31 | 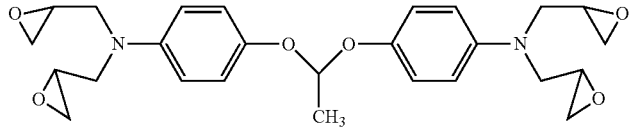 [SMILES: CC(Oc1ccc(N(CC2CO2)CC2CO2)cc1)Oc1ccc(N(CC2CO2)CC2CO2)cc1] |
| ERC-32 | 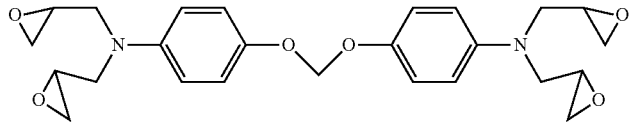 [SMILES: c1cc(N(CC2CO2)CC2CO2)ccc1OCOc1ccc(N(CC2CO2)CC2CO2)cc1] |
| ERC-33 | 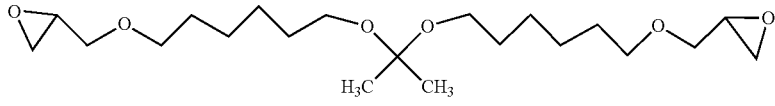 [SMILES: CC(C)(OCCCCCCOCC1CO1)OCCCCCCOCC1CO1] |
| ERC-34 | 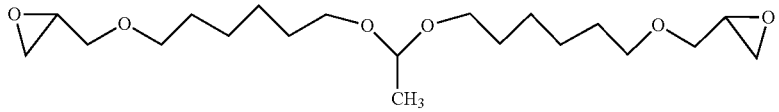 |
| ERC-35 | 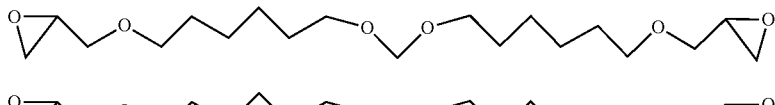 |
| ERC-36 | 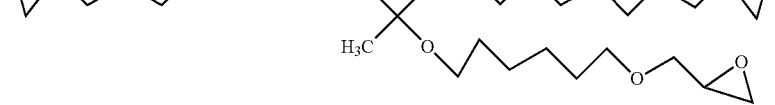 |
| ERC-37 | 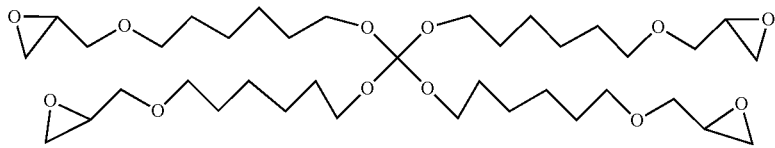 [SMILES: C(CCCOC(OCCCCCCOCC1CO1)(OCCCCCCOCC1CO1)OCCCCCCOCC1CO1)CCOCC1CO1] |
| ERC-38 | 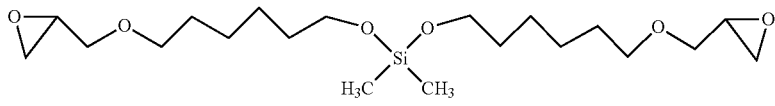 [SMILES: C[Si](C)(OCCCCCCOCC1CO1)OCCCCCCOCC1CO1] |
| ERC-39 | 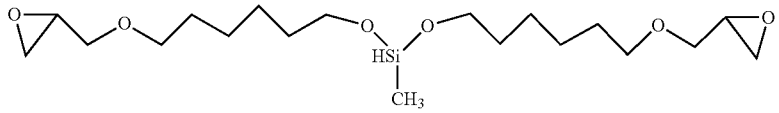 |
| ERC-40 | 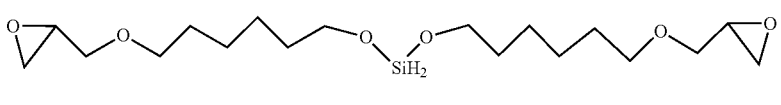 |
| ERC-41 | 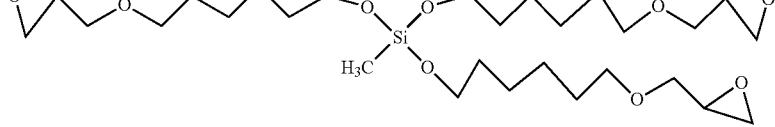 |

TABLE 1-continued

| S. No. | Compounds of structural Formula I |
|---|---|
| ERC-42 | |
| ERC-43 | |
| ERC-44 | |
| ERC-45 | |
| ERC-46 | |
| ERC-47 | |
| ERC-48 | |
| ERC-49 | |
| ERC-50 | |

TABLE 1-continued
| S. No. | Compounds of structural Formula I |
|---|---|
| ERC-51 | 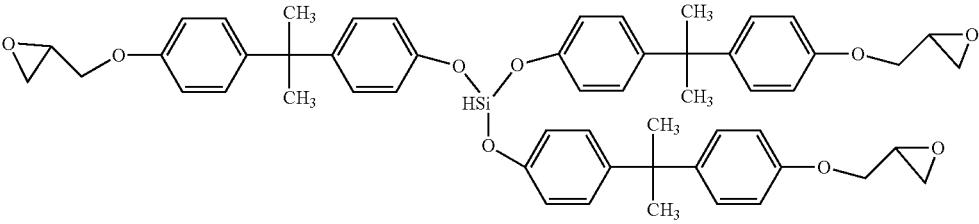 |
| ERC-52 | 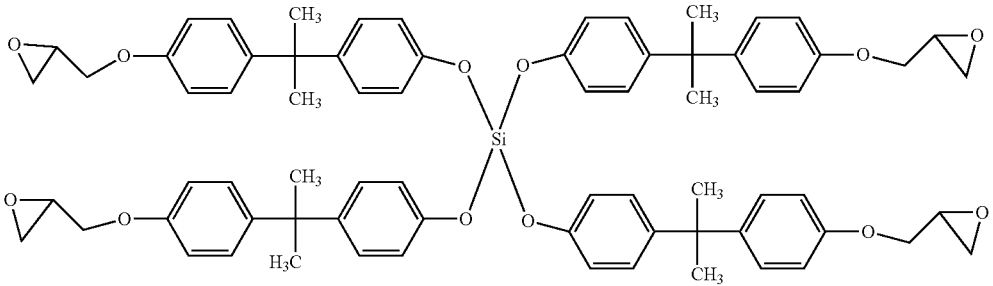 [SMILES: CC(C)(c1ccc(OCC2CO2)cc1)c1ccc(O[Si](Oc2ccc(C(C)(C)c3ccc(OCC4CO4)cc3)cc2)(Oc2ccc(C(C)(C)c3ccc(OCC4CO4)cc3)cc2)Oc2ccc(C(C)(C)c3ccc(OCC4CO4)cc3)cc2)cc1] |
| ERC-53 | 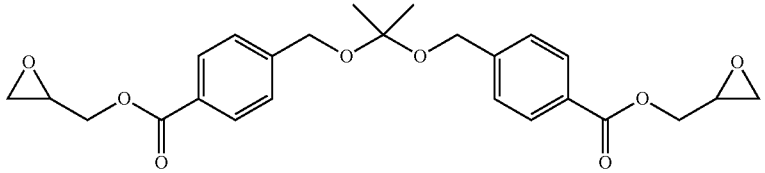 [SMILES: CC(C)(OCc1ccc(C(=O)OCC2CO2)cc1)OCc1ccc(C(=O)OCC2CO2)cc1] |
| ERC-54 | 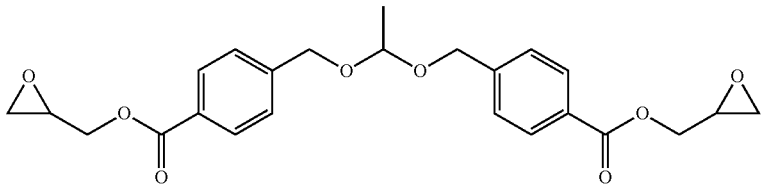 [SMILES: CC(OCc1ccc(C(=O)OCC2CO2)cc1)OCc1ccc(C(=O)OCC2CO2)cc1] |
| ERC-55 | 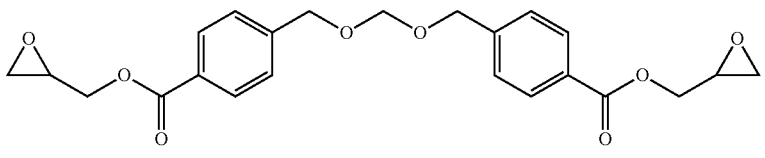 [SMILES: O=C(OCC1CO1)c1ccc(COCOCc2ccc(C(=O)OCC3CO3)cc2)cc1] |
| ERC-56 | 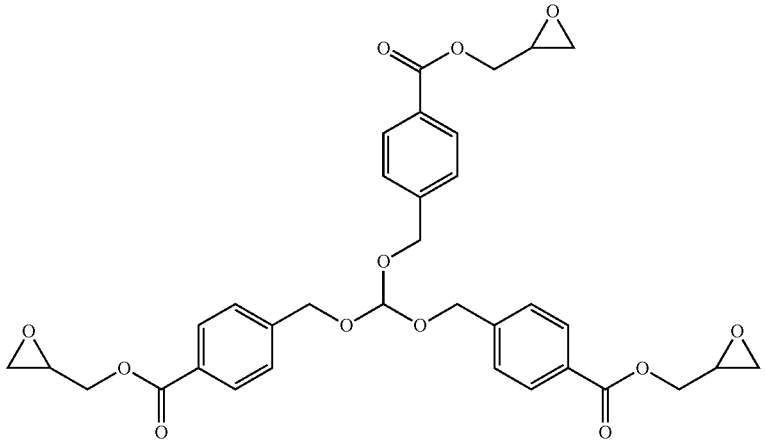 [SMILES: O=C(OCC1CO1)c1ccc(COC(OCc2ccc(C(=O)OCC3CO3)cc2)OCc2ccc(C(=O)OCC3CO3)cc2)cc1] |

TABLE 1-continued
| S. No. | Compounds of structural Formula I |
|---|---|
| ERC-57 | 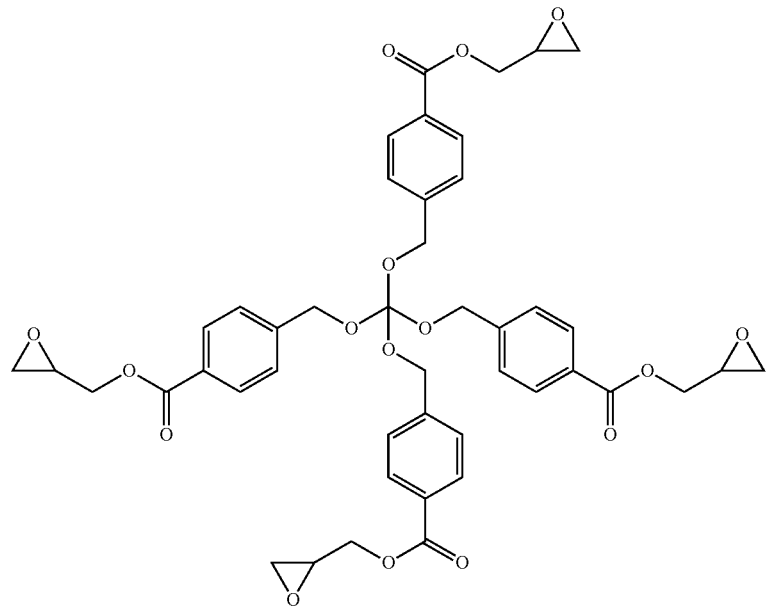 [SMILES: O=C(OCC1CO1)c1ccc(COC(OCc2ccc(C(=O)OCC3CO3)cc2)(OCc2ccc(C(=O)OCC3CO3)cc2)OCc2ccc(C(=O)OCC3CO3)cc2)cc1] |
| ERC-58 | 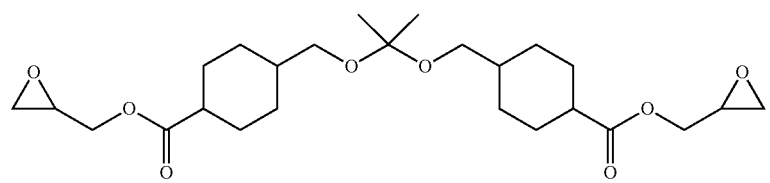 [SMILES: CC(C)(OCC1CCC(C(=O)OCC2CO2)CC1)OCC1CCC(C(=O)OCC2CO2)CC1] |
| ERC-59 | 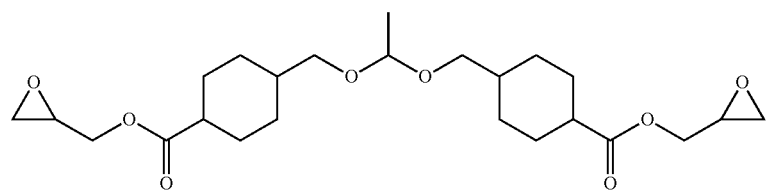 [SMILES: CC(OCC1CCC(C(=O)OCC2CO2)CC1)OCC1CCC(C(=O)OCC2CO2)CC1] |
| ERC-60 | 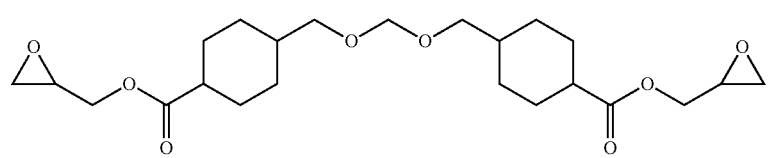 [SMILES: O=C(OCC1CO1)C1CCC(COCOCC2CCC(C(=O)OCC3CO3)CC2)CC1] |
| ERC-61 | 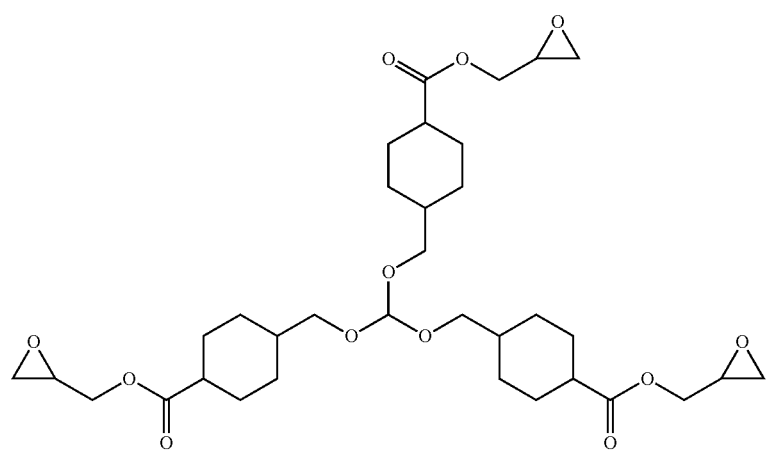 [SMILES: O=C(OCC1CO1)C1CCC(COC(OCC2CCC(C(=O)OCC3CO3)CC2)OCC2CCC(C(=O)OCC3CO3)CC2)CC1] |

TABLE 1-continued

| S. No. | Compounds of structural Formula I |
|---|---|
| ERC-62 | |
| ERC-63 | |
| ERC-64 | |
| ERC-65 | |
| ERC-66 | |

TABLE 1-continued

| S. No. | Compounds of structural Formula I |
|---|---|
| ERC-67 | 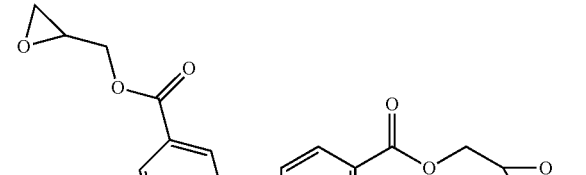 |

In accordance with an embodiment, the epoxy resin component having the structural Formula II is represented by:

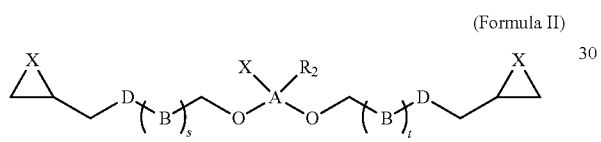

(Formula II)

wherein
A is carbon or silicon,
D is oxygen, nitrogen or carboxylic group,
X is oxygen or sulfur,
s and t is independently from 1 to 20,
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene,
alkylene-heterocycloalkenylene-alkenylene, alkynylene heterocycloalkenylene, alkynylene-heterocycloalkenylene, alkynylene.

In accordance with an embodiment, the epoxy resin component having the structural Formula II is one of the following compounds:

TABLE 2

| S. No. | Compounds of Structural Formula II |
|---|---|
| ERC-1 | |

TABLE 2-continued

| S. No. | Compounds of Structural Formula II |
|---|---|
| ERC-2 | 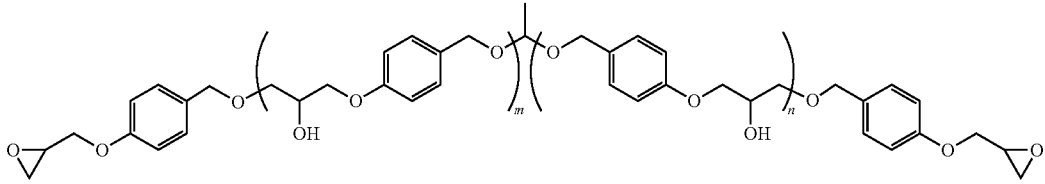 |
| ERC-3 | 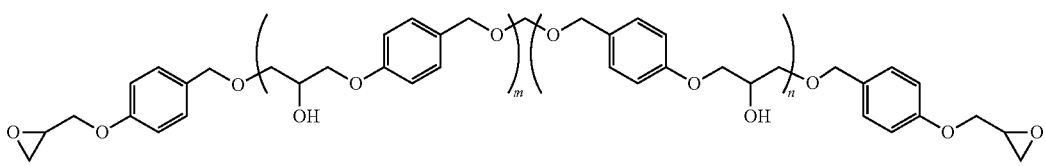 |
| ERC-4 | 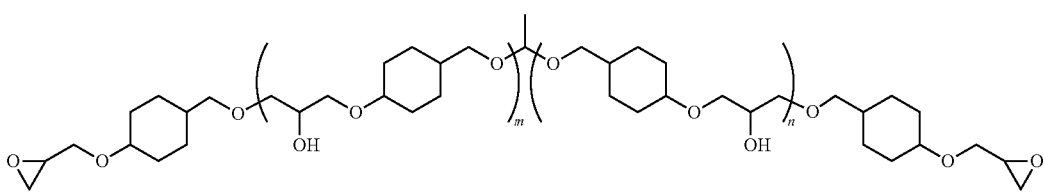 |
| ERC-5 | 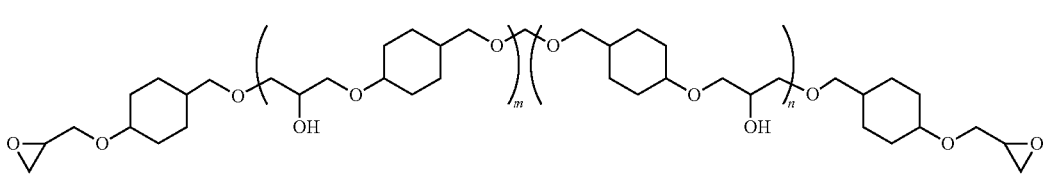 |
| ERC-6 | 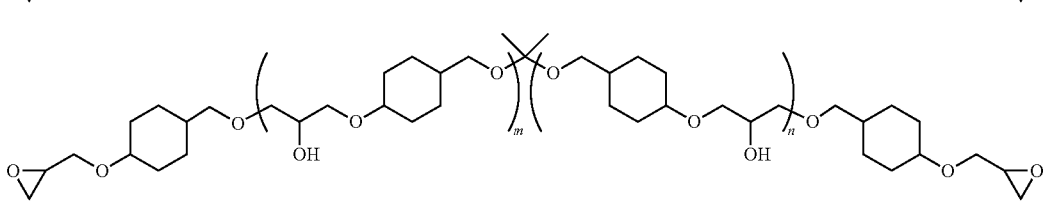 |

In accordance with an embodiment, the epoxy resin component having the structural Formula I and the epoxy resin component having the structural Formula II includes either an acetal, a ketal, an orthoester and an orthocarbonate linkage. The acetal, ketal, orthoester and orthocarbonate linkage of the epoxy resin component are degradable upon exposure to elevated temperature or an acidic medium. Thus, the softening of the epoxy resin component having the structural Formula I and the structural Formula II is as a result of the decomposition of the acetal, ketal, orthocarbonate and orthoester linkage in the epoxy resin component and which allows the epoxy resin system to be recyclable.

In accordance with an embodiment, the epoxy resin component having the structural Formula I has a number average molecular weight (Mn) of 200 to 1000 and the epoxy resin component having the structural Formula II has a number average molecular weight (Mn) of 950. Preferably, $M_n$ is at least 300 to 2000.

In accordance with an embodiment, the viscosity of the epoxy resin component having the structural Formula I is in a range of 500 to 40,000 mPa·s and the epoxy resin component having the structural Formula II is in a range of 1000 to 60,000 mPa·s.

In accordance with an embodiment, the epoxy resin component having the structural Formula I has an epoxy equivalent weight (EEW) in a range of 100 to 600 gm/eq and the epoxy resin component having the structural Formula II has an epoxy equivalent weight (EEW) in a range of 150 to 2000 gm/eq. The term "epoxy equivalent weight" in the context of the present disclosure means "the weight of resin in grams that contains one equivalent of epoxy".

Based on the heat, mechanical and chemical resistance requirements, the epoxy resin component having the structural Formula I and the epoxy resin component having the structural Formula II can be chosen and used.

In another aspect, the present disclosure also provides a recyclable epoxy resin system. The recyclable epoxy resin system comprises of the epoxy resin component having the structural Formula I or the epoxy resin component having the structural Formula II and a curing agent.

In accordance with an embodiment, the curing agent is selected from a group comprising of aliphatic amines, alicyclic polyamines, aromatic amines, polyether amines, ketoimines, anhydrides, polyamides, imidazoles, polythiols, polyphenols, polycarboxylic acid, carboxylic based polyesters, carboxylic based polyacrylates, UV curing agents and a combination thereof. Examples of the curing agent include but are not limited to diethylenetriamine, triethylenetetramine, tetraethylenepentamine, diproprenediamine, diethylaminopropylamine, amine 248, menthane diamine (MDA), isophoronediamine, wandamin, m-xylenediamine, metaphenylene diamine, diaminodiphenylmethane, phthalic anhydride, trimellitic anhydride, pyromellitic anhydride, benzophenone tracarboxylic anhydride, dicyandiamide, triphenylsulfonium hexafluorophosphate, polysulfide resin, 2-methylimidazole 2-ethyl-4-methylimidazole 1-cyano-ethyl-2-undecylimidazolium trimellitate, piperidine N,N-dimethylpiperidine, triethylenediamine.

In accordance with an embodiment, the epoxy resin component having the structural Formula I or the epoxy resin component having the structural Formula II and the curing agent in the recyclable epoxy resin system are added in a w/w ratio in a range of 1 to 15. In an example, the epoxy resin component having the structural Formula I or the epoxy resin component having the structural Formula II and the curing agent in the recyclable epoxy resin system are added in a w/w ratio in a range of 4 to 8. The ratio of the epoxy resin component having the structural Formula I or the epoxy resin component having the structural Formula II and the curing agent in the recyclable epoxy resin system depends on the intended use and application of the epoxy resin system.

In accordance with an embodiment, the recyclable epoxy resin system may further comprise additives. Said additives may be added as a separate component in addition to the epoxy resin component having the structural Formula I or the epoxy resin component having the structural Formula II and the curing agent. The additives include fibers, tougheners, flexibilizers, pigments, fillers, defoamers, wetting agents or combination thereof. In accordance with an embodiment, the total amount of additives in the recyclable epoxy resin system does not exceed 80 wt. % of the total weight of the recyclable epoxy resin system.

In accordance with another aspect, the present disclosure also provides a process for preparing the epoxy resin component having the structural Formula I and the epoxy resin component having the structural Formula II.

The process comprises partially epoxidizing a polyhydric alcohol having one or more hydroxyl group with an epihalohydrin to obtain a partially epoxidized alcohol. The term "partially epoxidized alcohol" in the context of the present disclosure means an alcohol in which at least one of the hydroxyl group of the polyhydric alcohol is not converted to an epoxide group.

The partial epoxidized alcohol is then reacted with a compound having a structural Formula III, a compound having a structural Formula IV or a compound having a structural Formula V to obtain the epoxy resin component (s). The epoxy resin component (s) as obtained by this process is a mixture of a monomeric form of the epoxy resin component having the structural Formula I and an oligomeric form of the epoxy resin component having the structural Formula II.

In accordance with an embodiment, the polyhydric alcohol having one or more hydroxyl group is selected from a group comprising of hydroxy phenyl alkanol, hydroxy cycloalkyl alkanol and hydroxy diphenyl alkanol. Examples of the polyhydric alcohol having one or more hydroxyl group include but are not limited to 4-hydroxy benzyl alcohol, 2-hydroxy benzyl alcohol, Bisphenol A, Bisphenol F, Bisphenol S, dihydroxy phenyl alkanol, di hydroxy benzyl alcohol, hydroxy phenyl alkanol, and hydroxy alkyl cyclo alkanol.

In accordance with an embodiment, the partial epoxidation of the polyhydric alcohol is carried out in the presence of a base. In accordance with an embodiment, the base is selected from a group comprising of hydroxides of alkali metals and carbonates of alkali metals. Examples of the base include but are not limited to sodium hydroxide, potassium hydroxide, sodium carbonate, sodium bicarbonate, lithium hydroxide, barium hydroxide, calcium hydroxide, and magnesium hydroxide.

In accordance with an embodiment, the partial epoxidation of the polyhydric alcohol is carried out in the presence of a solvent. The solvent is selected from a group comprising of toluene, xylene, methyl iso butyl ketone, acetone, methyl ethyl ketone, butyl cellosolve, ethers, furans.

In accordance with an embodiment, the epihalohydrin is selected from a group comprising of epichlorohydrin, epibromohydrin, epifluorohydrin, and epiiodohydrin.

In accordance with an embodiment, the polyhydric alcohol having one or more hydroxyl group to the epihalohydrin are added in a molar ratio in a range of 0.01 to 5.

In accordance with an embodiment, the partial epoxidation of the polyhydric alcohol with the epihalohydrin is carried out at a temperature in a range of 30 to 120° C. to obtain the partially epoxidized alcohol.

The compound having the structural Formula III is represented by:

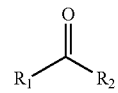

(Formula III)

wherein $R_1$ and $R_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy.

In accordance with an embodiment, the compound having the structural Formula III includes but is not limited to formaldehyde, paraformaldehyde, acetaldehyde, benzaldyhyde, acetone, and methyl ethyl ketone.

The compound having the structural Formula IV is represented by:

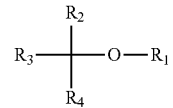

(Formula IV)

wherein $R_1$ is independently hydrogen, alkyl, aryl, aralkyl, alkenyl, alkynyl;

$R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy.

In accordance with an embodiment, the compound having the structural Formula IV includes but is not limited to 2-methoxy propene, 2-2 dimethoxy propane, 2-ethoxy propene, 2-2 di-ethoxy propane, 2-2 di-propoxy propane.

The compound having the structural Formula V is represented by:

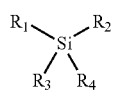

(Formula V)

wherein

R₁, R₂, R₃, R₄ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy.

In accordance with an embodiment, the compound having the structural Formula V includes but is not limited to tetra alkoxy silane, tri alkoxy silanes and di alkoxy silanes.

In accordance with an embodiment, the reaction of the partially epoxidized alcohol with the compound having the structural Formula III, the compound having the structural Formula IV or the compound having the structural Formula V, is carried out in the presence of an acidic catalyst.

The acidic catalyst for the reaction of the partially epoxidized alcohol with the compound having the structural Formula III, the compound having the structural Formula IV or the compound having the structural Formula V is selected from a group comprising of a proton donor, a homogeneous acid catalyst and a heterogeneous acid catalyst. Examples of the acidic catalyst include but are not limited to methane sulphonic acid, para toluene sulphonic acid, versatic acid, acetic acid, hydrochloric acid, sulphuric acid, phosphoric acid, acidic ion exchange resin, sulphonates.

In accordance with an embodiment, the partially epoxidized alcohol to the compound having the structural Formula III, the compound having the structural Formula IV or the compound having the structural Formula V are added in a molar ratio in a range of 0.01 to 10.

In accordance with an embodiment the reaction of the partially epoxidized alcohol with the compound having the structural Formula III, the compound having the structural Formula IV or the compound having the structural Formula V is carried out at a temperature in the range of 5 to 100° C.

If an excess amount of the compound having the structural Formula III, the compound having the structural Formula IV or the compound having the structural Formula V are used, then greater is the fraction of the monomeric form of the epoxy resin component having the structural Formula I. Further, the monomeric form of the epoxy resin component having the structural Formula I can be separated from the oligomeric form of the epoxy resin component having the structural Formula II by means of separation techniques. In accordance with an embodiment, the separation techniques include but are not limited to chromatography, extractive distillation.

The present disclosure also provides an alternate method of preparing the epoxy resin component having the structural Formula I and the epoxy resin component having the structural Formula II.

The process comprises of partially epoxidizing a compound having a structural Formula VI or a compound having a structural Formula VII with a percarboxylic acid or hydrogen peroxide to obtain a partially epoxidized alcohol. Subsequent to the partial epoxidation, the partially epoxidized alcohol is further reacted with the compound having the structural Formula III, the compound having the structural Formula IV or the compound having the structural Formula V to obtain the epoxy resin component (s).

The epoxy resin component (s) as obtained by this process is a mixture of a monomeric form of the epoxy resin component having the structural Formula I and an oligomeric form of the epoxy resin component having the structural Formula II.

The compound having the structural Formula VI is represented by:

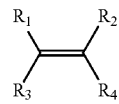

(Formula VI)

wherein

R₁, R₂, R₃, R₄ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, aryl hydroxide, alkyl hydroxide.

In accordance with an embodiment, the compound having the structural Formula VI has between 2 to 18 carbon atoms. Examples of the compound having the structural Formula VI includes but are not limited to vinyl alcohol, allyl alcohol, propeneol, butenol, pentenol, vinyl phenol, allyl phenol, 4 hydroxy phenyl ethene, 2 hydroxy phenyl ethene, 4 hydroxy phenyl propene, and 2 hydroxy phenyl propene.

The compound having the structural Formula VII is represented by:

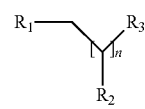

(Formula VII)

wherein

R₁ and R₂ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, alkyl hydroxide.

In accordance with an embodiment, the compound having the structural Formula VII has between 2 to 18 carbon atoms. Examples of the compound having the structural Formula VI includes but are not limited to cyclohexene 1 methanol, cyclopentene 2 methanol, cyclohexene 2 ethanol, and cyclopentene 2 ethanol.

In accordance with an embodiment, the partial epoxidation of the compound having the structural Formula VI and the compound having the structural Formula VII is done at a temperature in a range of 5° C. to 65° C. to obtain a partially epoxidized alcohol.

In accordance with an embodiment, the percarboxylic acid is selected from a group comprising of peracetic acid, m-chloro perbenzoic acid and per trifluoro acetic acid.

In accordance with an embodiment, the partial epoxidation of the compound having the structural Formula VI or the compound having the structural Formula VII with hydrogen peroxide is carried out in the presence of a catalyst system. In accordance with an embodiment, the catalyst system is prepared from an organic base, an inorganic base, sulphate of transition metal, and carbonate of transition metal. Examples of the inorganic base include but is not limited to sodium hydroxide, potassium hydroxide, sodium bicarbonate, and ammonium bicarbonate. Examples of the organic base include but is not limited to pyridine, tert-butyl alcohol.

In accordance with an embodiment, the reaction of the partially epoxidized alcohol with the compound having the structural Formula III, the compound having the structural Formula IV or the compound having the structural Formula V is carried out in the presence of an acidic catalyst and a solvent at a temperature in the range of 5 to 100° C. The solvent is selected from a group comprising of toluene, xylene, methyl iso butyl ketone, acetone, methyl ethyl ketone, butyl cellosolve, ethers, furans.

The acidic catalyst for the reaction of the partial epoxidized alcohol with the compound having the structural Formula III, the compound having the structural Formula IV or the compound having the structural Formula V is selected from a group comprising of a proton donor, a homogeneous acid catalyst and a heterogeneous acid catalyst. Examples of the acidic catalyst include but are not limited to methane sulphonic acid, para toluene sulphonic acid, versatic acid, acetic acid, hydrochloric acid, sulphuric acid, phosphoric acid, acidic ion exchange resin, sulphonates.

In accordance with an embodiment, the compound having the structural Formula VI or the compound having the structural Formula VII to the percarboxylic acid are added in a molar ratio in a range of 0.5 to 2.

In accordance with an embodiment, the compound having the structural Formula VI or the compound having the structural Formula VII to the hydrogen peroxide are added in a molar ratio in a range of 0.5 to 2.

In accordance with an embodiment, the partially epoxidized alcohol compound to the compound having the structural Formula III, the compound having the structural Formula IV or the compound having the structural Formula V are added in a molar ratio in a range of 0.01 to 10.

If an excess amount of the compound having the structural Formula III, the compound having the structural Formula IV or the compound having the structural Formula V are used, then greater is the fraction of the monomeric form of the epoxy resin component having the structural Formula I. Further, the monomeric form of the epoxy resin component having the structural Formula I can be separated from the oligomeric form of the epoxy resin component having the structural Formula II by means of separation techniques. In accordance with an embodiment, the separation techniques include but are not limited to chromatography, extractive distillation.

The present disclosure also provides an alternate method of preparing the epoxy resin component having the structural Formula I and the epoxy resin system having the structural Formula II.

The process comprises of reacting an amino alcohol with an acid compound to form an amino alcohol salt. The reaction of the amino alcohol with the acid compound results in the protection of an amine group of the amino alcohol by forming the amino alcohol salt.

In accordance with an embodiment, the amino alcohol compound has between 2 to 18 carbon atoms. The amino alcohol compound is selected from a group comprising of aliphatic amino alcohol, cycloaliphatic amino alcohol and aromatic amino alcohol compound. Examples of amino alcohol compound include but are not limited to ethanol amine, propanaolamine, butanol amine, amino phenol, amino phenyl ethanol, aminophenyl alkanol, amino benzyl alcohol.

In accordance with an embodiment, the acid compound is selected from a group comprising of a proton donor, a homogeneous acid catalyst and a heterogeneous acid catalyst. Examples of the acid compound include but are not limited to methane sulphonic acid, para toluene sulphonic acid, versatic acid, acetic acid, hydrochloric acid, sulphuric acid, phosphoric acid.

In accordance with an embodiment, the reaction of the amino alcohol with the acid compound is carried out at a temperature in a range of 20 to 100° C. to obtain the amino alcohol salt.

Subsequent to the formation of the amino alcohol salt, the amino alcohol salt is further reacted with the compound having the structural Formula III, the compound having the structural Formula IV or the compound having the structural Formula V in the presence of an acidic catalyst to obtain an intermediate compound. The reaction is carried out at a temperature in the range of 5 to 100° C.

The method further comprises of reacting the intermediate compound with a base to obtain an amino compound. In accordance with an embodiment, the intermediate compound is reacted with the base in the presence of a solvent. The solvent is selected from a group comprising of toluene, xylene, methyl iso butyl ketone, acetone, methyl ethyl ketone, butyl cellosolve, ethers, furans.

The obtained amino compound is further reacted with an epihalohydrin in the presence of a base to obtain to obtain the epoxy resin component (s). The epoxy resin component (s) as obtained by this process is a mixture of a monomeric form of the epoxy resin component having the structural Formula I and an oligomeric form of the epoxy resin component having the structural Formula II.

In accordance with an embodiment, the amino alcohol and the acid compound are added in a molar ratio in a range of 0.01 to 10.

In accordance with an embodiment, the amino alcohol salt and the compound having the structural Formula III, the compound having the structural Formula IV or the compound having the structural Formula V are added in a molar ratio in a range of 0.01 to 10.

In accordance with an embodiment, the amino compound and the epihalohydrin is added in a molar ratio in a range of 0.01 to 50 to obtain the epoxy resin component having the structural Formula I and the epoxy resin component having the structural Formula II.

In accordance with an embodiment, the base is selected from a group comprising of hydroxides of alkali metals and carbonates of alkali metals. Examples of the base include but are not limited to sodium hydroxide, potassium hydroxide, sodium carbonate, sodium bicarbonate, lithium hydroxide, barium hydroxide, calcium hydroxide, magnesium hydroxide. In accordance with an embodiment, the solvent is selected from a group comprising of toluene, xylene, methyl iso butyl ketone, acetone, methyl ethyl ketone, butyl cellosolve, ethers, furans.

In accordance with an embodiment, the amino alcohol compound to the epihalohydrin are added in a molar ratio in a range of 0.01 to 50.

If an excess amount of the compound having the structural Formula III, the compound having the structural Formula IV or the compound having the structural Formula V are used, then greater is the fraction of the monomeric form of the epoxy resin component having the structural Formula I. Further, the monomeric form of the epoxy resin component having the structural Formula I can be separated from the oligomeric form of the epoxy resin component having the structural Formula II by means of separation techniques.

In accordance with an embodiment, the separation techniques include but are not limited to chromatography, extractive distillation.

In accordance with an aspect, a process for recycling the epoxy resin system is also disclosed. The epoxy resin system is a reaction product of the epoxy resin component having the structural Formula I or the epoxy resin system having the structural Formula II and the curing agent is also disclosed. The process comprises of heating the epoxy resin system and immersing the heated epoxy resin system in an acid and a solvent to dissolve the epoxy resin component.

In accordance with an embodiment, the epoxy resin system is heated to a temperature in a range of 50 to 150° C. In accordance with an embodiment, the heated epoxy resin system is immersed in the acid and the solvent for sufficient period for the dissolution of the epoxy resin component (s). The period that is required for dissolution of the epoxy resin component ranges from 2 to 24 hours.

In accordance with an embodiment, the acid in which the heated epoxy resin system is immersed is selected from a group comprising of a strong proton donor acid compound and a weak proton donor acid compound. The acid selection is done on the basis of time required for cleavage, temperature and the solvent used. Example of the acid includes but are not limited to methane sulphonic acid, para toluene sulphonic acid, versatic acid, acetic acid, hydrochloric acid, sulphuric acid, phosphoric acid.

In accordance with an embodiment, the solvent is selected from a group comprising of aliphatic hydrocarbons, aromatic hydrocarbons, ethers, ketones, acetates, aldehydes, furans and water. Example of the solvent include but are not limited to toluene, xylene, methyl iso butyl ketone, acetone, methyl ethyl ketone, butyl cellosolve, ethers, furans, alcohols.

The invention will now be described with respect to the following examples which do not limit the invention in any way and only exemplify the invention.

Example 1

Synthesis of re-workable epoxy resin 2,2'-(4,4'-(propane-2,2 diylbis(oxy))bis(methylene)bis(4,1-phenylene))bis(oxy)bis(methylene)dioxirane

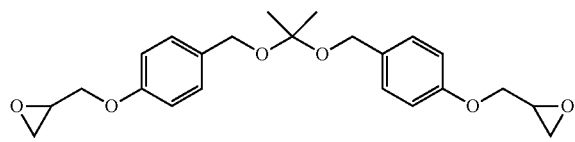 [SMILES: CC(C)(OCc1ccc(OCC2CO2)cc1)OCc1ccc(OCC2CO2)cc1]

Synthesis of di-glycidel ether with ketal group involves 2 steps:

Step-1: Synthesis of glycidel ether of 4-hydroxyl methyl phenol (4HMP-GE) is achieved through reaction of 4-hydroxyl methyl phenol (4 HMP), epihalohydrin and caustic soda (50% NaOH). 500 gm of 4-hydroxyl methyl phenol (4 HMP) was reacted with 2500 gm of epihalohydrin (ECH/4 HMP mole ratio=6.71) with 1200 gm toluene as solvent. 323 gm of caustic soda (50% NaOH) is reacted slowly with the reaction mixture at 55 deg c temperature and 122 mbar vacuum to get 256 gm of reaction water. After the reaction is complete, residual epichlorohydrin and toluene are removed through vaporization and resin product is filtered to remove sodium chloride (NaCl). 673 gm of resin product glycidel ether of 4-hydroxyl methyl phenol (4HMP-GE) is obtained having EEW of 192 gm/eq. Resin product thus formed is very useful and being used as two, three or four functional groups in a formal/ketal, tri orthoformate and ortho carbonate resin molecules.

Step-2: 50 gm of glycidel ether of 4-hydroxyl methyl phenol (4HMP-GE) formed above is reacted with 40 gm of 2-methoxy propene (2MP) in the presence of 120 gm xylene as solvent and 0.1 gm of p-toluene sulphonic acid (pTSA). The reaction was carried at 22 deg C. temperature and after 1 hr the temperature was increased to 55 Deg C. and vacuum of 180 mbar was applied. After removing 131 gm of overhead condensate the catalyst was neutralized with 0.23 gm of Sodium bi carbonate (NaHCO₃). 54 gm crude is obtained as product having EEW of 216 gm/eq and purity of 59% ketal monomer and 20% ketal oligomer, 8% 4HMP-GE and 13% mono glycidel ether ketal. It was further distilled separate monomer from oligomer, 4 HMP-GE and mono glycidel ether ketal. At the end of purification 28 gm of title product was recovered with 93% purity (while remaining 7% being oligomer).

Example 2

Synthesis of re-workable epoxy resin 2,2'-(4,4'-(propane-2,2 diylbis(oxy))bis(methylene)bis(4,1-phenylene))bis(oxy)bis(methylene)dioxirane by alkene Alcohol Epoxidation Process

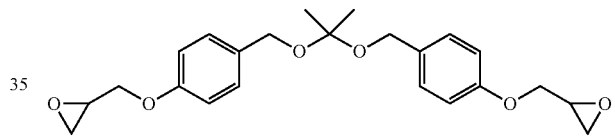

Step 1: 4-(2-Oxiranylmethoxyl)-benzenemethanol was synthesized in first step.

328.4 gm of 4-(2-propen-1-yloxy)-benzenemethanol, 2 mole) was added to 4-necked reaction flask in the presence of 0.4 M aqueous solution of ammonium bicarbonate 1 litre (0.40 mol), manganese sulfate monohydrate 8.46 gm (0.50 mol), 600 ml of ionic liquid such as 1-Butyl-3-methylimidazolium hexaflurophosphate. At 35 deg C., 30% hydrogen peroxide was slowly added dropwise 566.8 g (5 mol) for 2 hours. After finishing the dropping, the reaction was carried out at 30-35° C. for 6 hours. Sampling and analysis, the reaction solution was measured for check conversion of starting material by Gas Chromatography (GC)

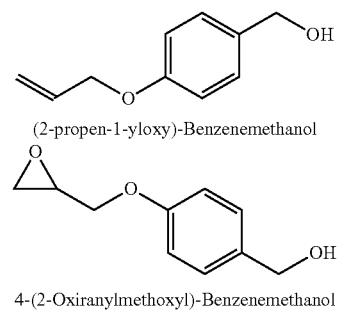

(2-propen-1-yloxy)-Benzenemethanol 4-(2-Oxiranylmethoxyl)-Benzenemethanol

Step 2:

50 gm of 4-(2-Oxiranylmethoxyl)-Benzenemethanol formed above is reacted with 40 gm of 2-methoxy propene (2MP) in the presence of 120 gm xylene as solvent and 0.1 gm of p-toluene sulphonic acid (pTSA). The reaction was carried at 22 deg C. temperature and after 1 hr the temperature was increased to 55 Deg C. and vacuum of 180 mbar was applied. After removing 131 gm of overhead condensate the catalyst was neutralized with 0.23 gm of Sodium bi carbonate ($NaHCO_3$). 54 gm crude is obtained as product having EEW of 235 gm/eq and purity of 61% ketal monomer and 16% ketal oligomer, 8% 4HMP-GE and 15% mono glycidel ether ketal.

Example 3

Synthesis of re-workable epoxy resin 2,2'-(4,4'-(propane-2,2 diylbis(oxy))bis(methylene)bis(4,1-phenylene))bis(oxy)bis(methylene) glycidel amines by amine Epoxidation Process

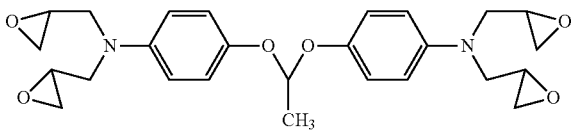

Step 1: To synthesize 4-aminophenol hydrochloride.

50 gm of 4-aminophenol was added to 1 L reaction flask and dissolved with 200 gm of methanol at 15° C. with stirring, was slowly charged 37% HCl. After finishing the charging, the reaction was maintained 2 hrs and at pH 7.

Step 2:

To synthesize 4,4[(1-methylethylidene)bis(oxymethylene)]bis-Benzenamine.

50 gm of 4-aminophenol hydrochloride was dissolved 60 gm of dimethyl sulfoxide and 200 gm of xylene and reacted with 40 gm of 2-methoxy propene (2MP) and 0.1 gm of p-toluene sulphonic acid (pTSA). The reaction was carried at 22 deg C. temperature and after 1 hr the temperature was neutralized with 33 gm of 50% NaOH. The mixture was distillate off to remove solvent at 65° C. and vacuum of 180 mbar was applied. After removing the crude product was purified by fractional distillation technique, the distillate was check of product purity by gas chromatography.

Step 3:

To synthesize epoxidized glycidyl amines from 50 gm of 4,4'-[(1-methylethylidene) bis(oxymethylene)] bis-Benzenamine (0.18 mol) and 133 gm of epihalohydrin. Both the raw materials were added to the 4-neck reaction flask with stirring. 59 gm of 50% NaOH is added slowly with the reaction mixture at 55 deg C. and 120 mbar vacuum to get 9 gm of water. After the reaction is complete, residual epichlorohydrin and toluene are removed through vaporization and resin product is filtered to remove sodium chloride (NaCl). 40 gm of resin product glycidel amines of 4,4'-[(1-methylethylidene) bis(oxymethylene)]bis-Benzenamine is obtained having EEW of 130 gm/eq.

Example 4

Synthesis of re-workable epoxy resin bis(4-(oxiran-2-ylmethoxy)benzyloxy)methane

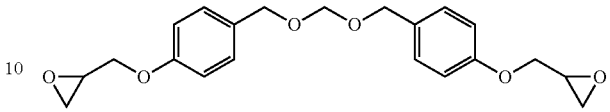

Synthesis of di-glycidel ether with formal group involves 2 steps:

Step-1: synthesis of glycidel ether of 4-hydroxyl methyl phenol (4HMP-GE) is achieved through mechanism shared in example-1.

Step-2: 50 gm of glycidel ether of 4-hydroxyl methyl phenol (4HMP-GE) (0.28 moles) formed above is reacted with 6.3 gm of paraformaldyhde in the presence of 120 gm methyl t-butyl ether as solvent and 0.1 gm of p-toluene sulphonic acid (pTSA). The reaction was carried at 55-60 deg C. temperature and after 1 hr the temperature was increased to 55 Deg C. and vacuum of 200 mbar was applied. After removing 127 gm of overhead condensate the catalyst was neutralized with 0.23 gm of Sodium bi carbonate ($NaHCO_3$). 45 gm crude is obtained as product having EEW of 201 gm/eq and purity of 67% formal monomer and 15% formal oligomer, 8% 4HMP-GE and 10% mono glycidel ether formal. It was further distilled separate monomer from oligomer, 4 HMP-GE and mono glycidel ether formal. At the end of purification 28 gm of title product was recovered with 93% purity (while remaining 7% being oligomer).

Example 5

Synthesis of re-workable epoxy resin 2,2'-(4,4'-(ethane-1,1-diylbis(oxy))bis(methylene)bis(4,1-phenylene))bis(oxy)bis(methylene)dioxirane

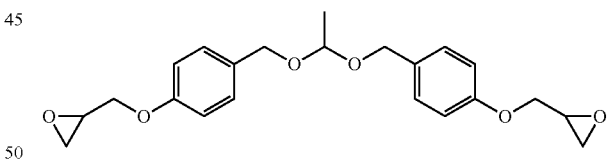

Synthesis of di-glycidel ether with formal group involves 2 steps:

Step-1: synthesis of glycidel ether of 4-hydroxyl methyl phenol (4HMP-GE) is achieved through mechanism shared in example-1.

Step-2: 50 gm of glycidel ether of 4-hydroxyl methyl phenol (4HMP-GE) (0.28 moles) formed above is reacted with 9 gm of acetaldehyde in the presence of 80 gm methyl t-butyl ether as solvent and 0.1 gm of p-toluene sulphonic acid (pTSA). The reaction was carried at 55-60 deg C. temperature and after 1 hr the temperature was increased to 55 Deg C. and vacuum of 200 mbar was applied. After removing 93 gm of overhead condensate the catalyst was neutralized with 0.23 gm of Sodium bi carbonate ($NaHCO_3$). 37 gm crude is obtained as product having EEW of 210 gm/eq and purity of 55% acetal monomer and 28% acetal oligomer, 13% 4HMP-GE and 4% mono glycidel ether acetal. It was further distilled separate monomer from oligomer, 4 HMP-GE and mono glycidel ether acetal. At the end of purification 12 gm of title product was recovered with 93% purity (while remaining 7% being oligomer).

Example 6

Synthesis of re-workable epoxy resin dimethylbis(4-(oxiran-2-ylmethoxy)benzyloxy)silane

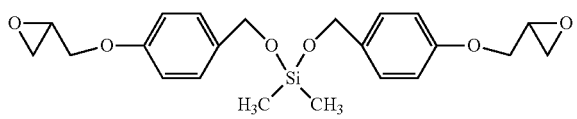

Synthesis of di-glycidel ether with formal group involves 2 steps:

Step-1: synthesis of glycidel ether of 4-hydroxyl methyl phenol (4HMP-GE) is achieved through mechanism shared in example-1.

Step-1:50 gm of glycidel ether of 4-hydroxyl methyl phenol (4HMP-GE) (0.28 moles) formed above is reacted with 19 gm of dimethyl Dimethoxy silane and 50 gm of toluene and 0.1 gm of p-toluene sulphonic acid (pTSA). The reaction was carried at 120 deg C. temperature and methanol was removed by fractional distillation. After complete removal of 8 gm methanol from overhead condensate the catalyst was neutralized with 0.23 gm of Sodium bi carbonate (NaHCO$_3$). 52 gm crude is obtained as product having EEW of 233 gm/eq Example 7

Synthesis of re-workable epoxy resin methyltris(4-(oxiran-2-ylmethoxy)benzyloxy)silane

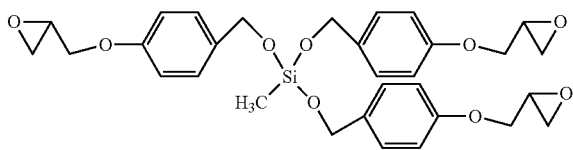 [SMILES: C[Si](OCc1ccc(OCC2CO2)cc1)(OCc1ccc(OCC2CO2)cc1)OCc1ccc(OCC2CO2)cc1]

Synthesis of di-glycidel ether with formal group involves 2 steps:

Step-1: synthesis of glycidel ether of 4-hydroxyl methyl phenol (4HMP-GE) is achieved through mechanism shared in example-1.

Step-2:50 gm of glycidel ether of 4-hydroxyl methyl phenol (4HMP-GE) (0.28 moles) formed above is reacted with 14 gm of methyl trimethoxy silane and 50 gm of toluene and 0.1 gm of p-toluene sulphonic acid (pTSA). The reaction was carried at 120 deg C. temperature and methanol was removed by fractional distillation. After complete removal of 8 gm methanol from overhead condensate the catalyst was neutralized with 0.23 gm of Sodium bi carbonate (NaHCO$_3$). 47 gm crude is obtained as product having EEW of 215 gm/eq Example: 8

Curing of the 2,2'-(4,4'-(propane-2,2-diylbis(oxy))bis(methylene)bis(4,1-phenylene))bis(oxy)bis(methylene)dioxirane (epoxy resin component) with poly amine Curing Agents 20 gm of 2,2'-(4,4'-(propane-2,2-diylbis(oxy))bis(methylene)bis(4,1-phenylene))bis(oxy)bis(methylene)dioxirane title product produced in example-1 is cured with 3.7 gm of isophorondiamine (IPDA). Curing was done at 100 Deg C. for 4 hours in a closed system. Resultant polymeric material was having Tg (glass transition temperature) of 85 deg C., tensile modulus of 3456 Pascal and flexural modulus of 3548 Pascal.

Example: 9

Reworkability and Recyclability of Cured Polymer

Specimens (10 gm) of cured polymer in example 2 is kept in acidic solution (5% acetic acid wt/wt with water) and in presence of tetrahydrofuran (THF) solvent at 130 Deg C. temperature. Within an hour the specimen started to soften and disintegrating in the acid solvent solution. Within 3 hours, the specimen is completely dissolved in the solution.

Example: 10

Reworkability and Recyclability of Cured Polymer

Specimens (10 gm) of cured polymer in example 2 is kept in acidic solution (7% methane Sulphonic acid wt/wt with water) and in presence of lean tetrahydrofuran (THF) solvent at 100° C. temperature. Lean solution of Tetrahydrofuran was prepared by mixing it with demineralized water in 1:9 weight ratio. Within an hour the specimen started to soften and disintegrating in the acid solvent solution. Within 3 hours, the specimen is completely dissolved in the solution.

Example: 11

Reworkability and Recyclability of Cured Polymer

Specimens (10 gm) of cured polymer in example 2 is kept in acidic solution (15% acetic acid wt/wt with water) and in presence of lean ethanol solvent at 90 Deg C. temperature. Within an hour the specimen started to soften and disintegrating in the acid solvent solution. Within 3 hours, the specimen is disintegrated into small pieces in the solution. Specific Embodiments are disclosed below:

An epoxy resin component for a recyclable epoxy resin system, the epoxy resin component having a structural Formula I or a structural Formula II

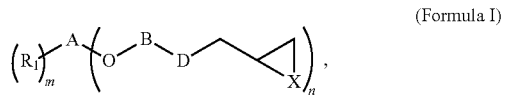
(Formula I)

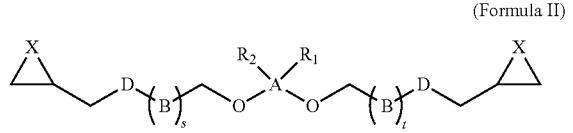
(Formula II)

wherein
m=0 then n=4,
m=1 then n=3,
m=2 then n=2,
A is carbon or silicon,
D is oxygen or nitrogen or carboxylic group,
X is oxygen or sulfur,
s and t is independently from 1 to 20,
R$_1$ and R$_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

Such epoxy resin component (s), wherein the epoxy resin component having the structural Formula I are same as those mentioned in Table 1.

Such epoxy resin component (s), wherein the epoxy resin component having the structural Formula II are same as those mentioned in Table 2.

A process for preparing an epoxy resin component having a structural Formula I and an epoxy resin component having a structural Formula II for an epoxy resin system. The process comprises partially epoxidizing a polyhydric alcohol having one or more hydroxyl group with an epihalohydrin in the presence of a base to obtain a partially epoxidized alcohol; and reacting the partially epoxidized alcohol with a compound having a structural Formula III, a compound having a structural Formula IV or a compound having a structural Formula V in the presence of an acidic catalyst to obtain the epoxy resin component having the structural Formula I and the epoxy resin component having the structural Formula II, wherein
the compound having the structural Formula III is represented by:

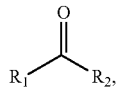
(Formula III)

wherein R$_1$ and R$_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy,
the compound having the structural Formula IV is represented by:

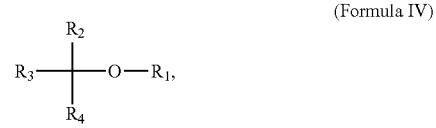
(Formula IV)

wherein R$_1$ is independently hydrogen, alkyl, aryl, aralkyl, alkenyl, alkynyl;
R$_2$, R$_3$, R$_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy;
the compound having the structural Formula V is represented by:

(Formula V)

wherein
R$_1$R$_2$, R$_3$, R$_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy,
wherein the epoxy resin component having the structural Formula I and the structural Formula II is:

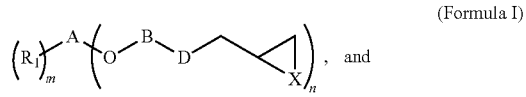
(Formula I)

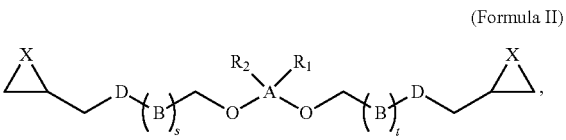
(Formula II)

respectively.
wherein
m=0 then n=4,
m=1 then n=3,
m=2 then n=2,
A is carbon or silicon,
D is oxygen or nitrogen or carboxylic group,
X is oxygen or sulfur,
s and t is independently from 1 to 20, R$_1$ and R$_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl, B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

Such process(es), wherein the polyhydric alcohol having one or more hydroxyl group is selected from a group comprising of hydroxy phenyl alkanol, hydroxy cycloalkyl alkanol, and hydroxy diphenyl alkanol.

Such process(es), wherein the polyhydric alcohol having one or more hydroxyl group to the epihalohydrin are added in a molar ratio in a range of 0.01 to 5.

Such process(es), wherein the partially epoxidized alcohol to the compound having the structural Formula III, the compound having the structural Formula IV or the compound having the structural Formula V are added in a molar ratio in a range of 0.01 to 10.

A process for preparing an epoxy resin component having a structural Formula I and an epoxy resin component having a structural Formula II for an epoxy resin system. The process comprising partially epoxidizing a compound having a structural Formula VI or a compound having a structural formula VII with a percarboxylic acid or hydrogen peroxide to obtain a partially epoxidized alcohol; and reacting the partially epoxidized alcohol with a compound having a structural Formula III, a compound having a structural Formula IV or a compound having a structural Formula V in the presence of an acidic catalyst to obtain the epoxy resin component having the structural Formula I and the epoxy resin component having the structural Formula II, wherein the compound having the structural Formula VI is represented by:

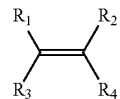

(Formula VI)

wherein

R$_1$, R$_2$, R$_3$, R$_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, aryl hydroxide, alkyl hydroxide the compound having the structural Formula VII is represented by:

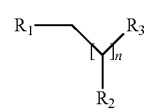

(Formula VII)

wherein

R$_1$ and R$_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, alkyl hydroxide the compound having the structural Formula III is represented by:

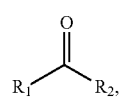

(Formula III)

wherein

R$_1$ and R$_2$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula IV is represented by:

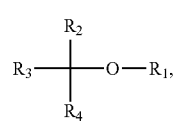

(Formula IV)

wherein

R$_1$ is independently hydrogen, alkyl, aryl, aralkyl, alkenyl, alkynyl;

R$_2$, R$_3$, R$_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, Alkoxy alkyl, aryloxy, the compound having the structural Formula V is represented by:

(Formula V)

$$R_1\underset{R_3}{\overset{R_2}{\underset{|}{\overset{|}{Si}}}}R_4;$$

wherein
R₁, R₂, R₃, R₄ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy,
wherein
the epoxy resin component having the structural Formula I and the structural Formula II is:

(Formula I)

$$\left(R_1\right)_m \overset{A}{\underset{}{\diagdown}} \left(O-B-D-\triangle\right)_n, \text{ and}$$

(Formula II)

$$\overset{X}{\triangle}-D\left(B\right)_s-O-\overset{R_2}{\underset{R_1}{\overset{|}{A}}}-O-\left(B\right)_t-D-\overset{X}{\triangle},$$

respectively.
wherein
m=0 then n=4,
m=1 then n=3,
m=2 then n=2,
A is carbon or silicon,
D is oxygen or nitrogen or carboxylic group,
X is oxygen or sulfur,
s and t is independently from 1 to 20,
R₁ and R₂ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl,
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene, cycloalkenylene, cycloalkenylene-alkylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

Such process(es), wherein the compound having the structural Formula VI and the compound having the structural Formula VII has between 2 to 18 carbon atoms.

Such process(es), wherein the compound having the structural Formula VI is selected from a group comprising of vinyl alcohol, allyl alcohol, propeneol, butenol, pentenol, vinyl phenol, allyl phenol, 4 hydroxy phenyl ethene, 2 hydroxy phenyl ethene, 4 hydroxy phenyl propene, and 2 hydroxy phenyl propene.

Such process(es), wherein the compound having the structural Formula VII is selected from a group comprising of cyclohexene 1 methanol, cyclo pentene 1 methanol, cyclohexene 2 ethanol, and cyclopentene 2 ethanol.

Such process(es), wherein the percarboxylic acid compound is selected from a group comprising of peracetic acid, m-chloro perbenzoic acid, and per trifluoro acetic acid.

Such process(es), wherein the compound having the structural Formula VI or the compound having the structural Formula VII to the percarboxylic acid are added in a molar ratio in a range of 0.5 to 2.

Such process(es), wherein the acidic catalyst is selected from a group comprising of a proton donor, a homogeneous acid catalyst and a heterogeneous acid catalyst.

Such process(es), wherein the partially epoxidized alcohol to the compound having the structural Formula III, the compound having the structural Formula IV or the compound having the structural Formula V are added in a molar ratio in a range of 0.01 to 10.

A process for preparing an epoxy resin component having a structural Formula I and an epoxy resin component having a structural Formula II for an epoxy resin system. The process comprising reacting an amino alcohol with an acid compound to form an amino alcohol salt, reacting the amino alcohol salt with a compound having a structural Formula III, a compound having a structural Formula IV or a compound having a structural Formula V in the presence of an acidic catalyst to obtain an intermediate compound, reacting the obtained intermediate compound with a base to obtain an amino compound; and epoxidizing the amino compound with an epihalohydrin in the presence of a base to obtain the epoxy resin component having the structural Formula I and the epoxy resin component having the structural Formula II, wherein,
the compound having the structural Formula III is represented by:

(Formula III)

$$\overset{O}{\underset{R_1\diagup\diagdown R_2,}{\|}}$$

wherein
R₁ and R₂ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula IV is represented by:

$$R_3 \overset{R_2}{\underset{R_4}{|}} O - R_1,$$ (Formula IV)

wherein $R_1$ is independently hydrogen, alkyl, aryl, aralkyl, alkenyl, alkynyl;

$R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, the compound having the structural Formula V is represented by:

$$R_1 \underset{R_3 \quad R_4}{\overset{R_2}{\underset{|}{Si}}};$$ (Formula V)

wherein $R_1$, $R_2$, $R_3$, $R_4$ are independently hydrogen, alkyl, alkenyl, alkynyl, methylene, cycloalkyl, cycloalkenyl, cycloalkynyl, aryl, heterocyclic, heterocycloalkyl, cycloalkenyl, heteroaryl, alkoxy, alkoxyaryl, alkoxy alkyl, aryloxy, wherein the epoxy resin component having the structural Formula I and the structural Formula II is $$\left( R_1 \right)_m A \left( O \diagdown B \diagdown D \diagdown \underset{X}{\triangle} \right)_n, \text{ and}$$ (Formula I)

$$\underset{X}{\triangle} \diagdown D \left( B \right)_s \diagdown O \overset{R_2 \; R_1}{\underset{|}{A}} O \left( B \right)_t \diagdown D \diagdown \underset{X}{\triangle},$$ (Formula II)

respectively.

wherein m=0 then n=4, m=1 then n=3, m=2 then n=2,

A is carbon or silicon,

D is oxygen or nitrogen or carboxylic group,

X is oxygen or sulfur, s and t is independently from 1 to 20, $R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl, B is independently arylene, arylene ethers, alkylene-arylene, alkylene-arylene-alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

Such process(es), wherein the amino alcohol has between 2 to 18 carbon atoms.

Such process(es), wherein the amino alcohol is selected from a group comprising of aliphatic amino alcohol, cycloaliphatic amino alcohol, and aromatic amino alcohol.

Such process(es), wherein the acid compound is selected from a group comprising of a proton donor, a homogeneous acid catalyst and a heterogeneous acid catalyst.

Such process(es), wherein the amino alcohol salt to the compound having the structural Formula III, the compound having the structural Formula IV or the compound having the structural Formula V are added in a molar ratio in a range of 0.01 to 10.

Such process(es), wherein the base is selected from a group comprising of hydroxides of alkali metals and carbonates of alkali metals.

Such process(es), wherein the amino compound to the epihalohydrin are added in a molar ratio in a range of 0.01 to 50.

Such process(es), wherein the compound having the structural Formula III is selected from a group comprising of formaldehyde, paraformaldehyde, acetaldehyde, benzaldehyde, acetone, and methyl ethyl ketone.

Such process(es), wherein the compound having the structural Formula IV is selected from a group comprising of 2-methoxy propene, 2-2 di methoxy propane, 2 ethoxy propene, 2-2 di ethoxy propane, and 2-2 di propoxy propane.

Such process(es), wherein the compound having the structural Formula V is selected from a group comprising of tetra alkoxy silane, tri alkoxy silanes and di alkoxy silanes.

An epoxy resin system comprising a curing agent; and an epoxy resin component having a structural Formula I or an epoxy resin component having a structural Formula II wherein the epoxy resin component having the structural Formula I and the structural Formula II is:

$$\left( R_1 \right)_m A \left( O \diagdown B \diagdown D \diagdown \underset{X}{\triangle} \right)_n, \text{ and}$$ (Formula I)

(Formula II)

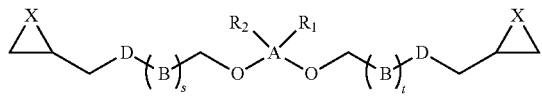

wherein
m=0 then n=4,
m=1 then n=3,
m=2 then n=2,
A is carbon or silicon,
D is oxygen or nitrogen or carboxylic group;
X is oxygen or sulfur,
s and t is independently from 1 to 20
$R_1$ and $R_2$ is independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxyaryl, alkoxy alkyl;
B is independently arylene, arylene ethers, alkylene-arylene, alkylene-arylene alkylene, alkenylene-arylene, alkenylene-arylene alkenylene, alkylene-arylene-alkenylene, alkynylene arylene, alkynylene-arylene-alkynylene, heteroarylene, alkylene-heteroarylene, alkylene-heteroarylene-alkylene, alkenylene-heteroarylene, alkenylene-heteroarylene-alkenylene, alkylene-heteroarylene-alkenylene, alkynylene heteroarylene, alkynylene-heteroarylene-alkynylene, alkylene, alkylene-hetero-alkylene, alkenylene, alkenylene-hetero-alkenylene, alkylene-hetero-alkenylene, alkynylene, cycloalkylene, alkylene-cycloalkylene, alkylene-cycloalkylene alkylene, alkenylene-cycloalkylene, alkenylene cycloalkylene-alkenylene, alkylene-cycloalkylene alkenylene, alkynylene-cycloalkylene, alkynylene cycloalkylene-alkynylene, heterocycloalkylene, alkylene heterocycloalkylene, alkylene-heterocycloalkylene alkylene, alkenylene-heterocycloalkylene, alkenylene heterocycloalkylene-alkenylene, alkylene heterocycloalkylene-alkenylene, alkynylene heterocycloalkylene, alkynylene-heterocycloalkylene alkynylene, cycloalkenylene, alkylene-cycloalkenylene, alkylene-cycloalkenylene-alkylene, alkenylene-cycloalkenylene, alkenylene-cycloalkenylene-alkenylene, alkylene cycloalkenylene-alkenylene, alkynylene-cycloalkenylene, alkynylene-cycloalkenylene-alkynylene, heterocycloalkenylene, alkylene-heterocycloalkenylene, alkylene-hetero cycloalkenylene-alkylene, alkenylene-heterocycloalkenylene, alkenylene-heterocycloalkenylene-alkenylene, alkylene-heterocycloalkenylene-alkenylene, alkynylene heterocycloalkenylene, alkynylene-heterocycloalkenylene, alkynylene.

Such recyclable epoxy resin system, wherein the curing agent is selected from a group comprising of aliphatic amines, alicyclic polyamines, aromatic amines, polyether amine, ketoimines, anhydrides, polyamides, imidazoles, polythiols, polyphenols, polycorboxylic acid, carboxylic based polyesters, carboxylic based polyacrylates, UV curing agents and a combination thereof.

Such recyclable epoxy resin system, for use as a matrix for manufacturing of a high-performance composites reinforced with glass, carbon, polyaramid and natural fibres in wind turbine rotor blades, automotive composites, sports and recreational goods, infrastructure, aerospace and defense and marine applications, consumer adhesives, industrial adhesives, structural adhesives, decorative coatings, industrial coatings, electrical, electronics, civil engineering and construction applications.

A process for recycling an epoxy resin system, the process comprising heating the epoxy resin system; and immersing the heated epoxy resin system in an acid and a solvent at a temperature in a range of 50 to 150° C., the recyclable epoxy resin system being a reaction product of an epoxy resin component having a structural Formula I or an epoxy resin component having a structural Formula II and a curing agent.

Such process (es), wherein the acid is selected from a group comprising of strong proton donor acid compounds and weak proton acid compounds.

Such process (es), wherein the solvent is selected from a group comprising of aliphatic hydrocarbons, aromatic hydrocarbons, ethers, ketones, acetates, aldehydes, furans, and water.

INDUSTRIAL APPLICABILITY

The epoxy resin components(s) disclosed herein allows for the production of recyclable epoxy resin system having reworkable and recyclable properties. The epoxy resin component (s) of the present disclosure can be used along with wide variety of curing agents such as aliphatic amines, alicyclic polyamines, aromatic amines, polyether amine, ketoimines, anhydrides, polyamides, imidazoles, polythiols, and polyphenols etc. The recyclable and reworkable epoxy resin component (s) disclosed herein offers several advantages which include fast strength development, longer pot-life, high cross-link density and good fiber wetting property.

The epoxy resin component (s) in accordance with the present disclosure possesses desirable processing and performance properties suitable for wide ranging composite processes. The epoxy resin component (s) of the present disclosure are also suitable for applications in high-tech fields for examples microelectronics, transportation, aerospace industries and composite applications. The epoxy resin component(s) have suitable characteristic that make them amenable for use in standard thermosetting composite manufacturing techniques such as wet lay-up, filament winding, vacuum infusion, compression molding, resin transfer molding. These composites materials have excellent mechanical properties that make them useful for different composite applications. These composite materials can also be degraded under specific conditions, leading to the separation and recovery of both the reinforcing fiber and the epoxy resin component(s) in the form of an epoxy polymeric material. These composite materials can be recycled precisely because the epoxy matrix of a fabricated composite is derived from reworkable epoxy resin component (s). The recycling of degradable epoxy resin component (s) helps in the recovering the reinforcement material and other valuable components of the epoxy resin system with high efficiency.

The epoxy resin component (s) of the present disclosure can be used as a matrix for the manufacturing of the high-performance composites reinforced with glass, carbon, polyaramid and natural fibers. These composites are used in wind turbine rotor blades, automotive composites, sports and recreational goods, infrastructure, aerospace, defense and marine applications, consumer adhesives, industrial adhesives, structural adhesives, decorative coatings, industrial coatings, electrical, electronics, civil engineering and construction applications.

We claim:

1. A process for preparing an epoxy resin component having a structural Formula I for an epoxy resin system, the process comprising:
    epoxidizing a compound having a structural Formula VI with a percarboxylic acid compound or hydrogen peroxide to obtain an epoxidized alcohol; and
    reacting the epoxidized alcohol with a compound having a structural Formula III or a compound selected from a group consisting of 2-methoxy propene, 2-2 di methoxy propane, 2 ethoxy propene, 2-2 di ethoxy propane, and 2-2 di propoxy propane in the presence of an acidic catalyst to obtain the epoxy resin component having the structural Formula I,
wherein
the compound having the structural Formula VI is represented by:

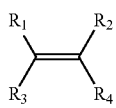

(Formula VI)

wherein $R_1$, $R_2$, and $R_3$, are hydrogen,
$R_4$ is any one of:

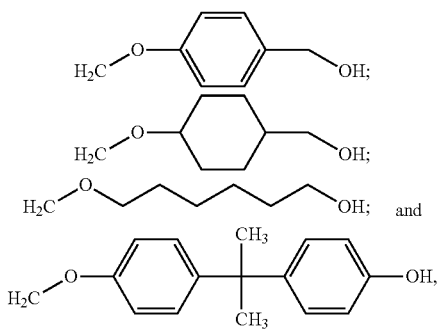

the compound having the structural Formula III is represented by:

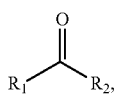

(Formula III)

wherein
$R_1$ and $R_2$ are independently hydrogen, alkyl, alkenyl, alkynyl, cycloalkyl, cycloalkenyl, cycloalkynyl, aryl, heterocyclic, heterocycloalkyl, cycloalkenyl, heteroaryl, alkoxy, alkoxyaryl, alkoxy alkyl, or aryloxy, and
the epoxy resin component having the structural Formula I is:

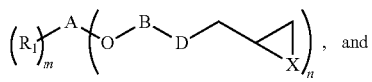

(Formula I)

and

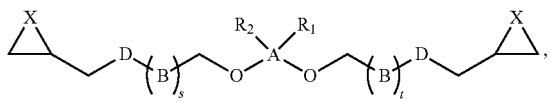

(Formula II)

wherein
m=0, 1 or 2 such that
if m=0 then n=4,
if m=1 then n=3, or
if m=2 then n=2,
A is carbon,
D is oxygen,
X is oxygen, and
B is independently alkylene-arylene, arylene-alkylene-arylene, alkylene, or alkylene-cycloalkylene.

2. The process as claimed in claim 1, wherein the percarboxylic acid compound is selected from a group consisting of peracetic acid, m-chloro perbenzoic acid, and per trifluoro acetic acid.

3. The process as claimed in claim 1, wherein the compound having the structural Formula VI and the percarboxylic acid compound or hydrogen peroxide are provided in a molar ratio in a range of 0.5 to 2.

4. The process as claimed in claim 1, wherein the acidic catalyst is selected from a group consisting of a proton donor, a homogeneous acid catalyst and a heterogeneous acid catalyst.

5. The process as claimed in claim 1, wherein the epoxidized alcohol and the compound having the structural Formula III or the compound selected from a group consisting of 2-methoxy propene, 2-2 di methoxy propane, 2 ethoxy propene, 2-2 di ethoxy propane, and 2-2 di propoxy propane are provided in a molar ratio in a range of 0.01 to 10.

6. The process as claimed in claim 1, wherein the compound having the structural Formula III is selected from a group consisting of formaldehyde, paraformaldehyde, acetaldehyde, benzaldehyde, acetone, and methyl ethyl ketone.

7. A process for preparing an epoxy resin component of Formula I, said process comprising the steps of:
    a. epoxidizing 4-(2-propen-1-yloxy)-benzenemethanol with a percarboxylic acid compound or hydrogen peroxide to obtain 4-(2-Oxiranylmethoxyl)-benzenemethanol; and
    b. reacting the obtained 4-(2-Oxiranylmethoxyl)-benzenemethanol with 2-methoxy propene in the presence of an acid catalyst to obtain the epoxy resin component of Formula I,
wherein the epoxy resin component of formula I is represented by:

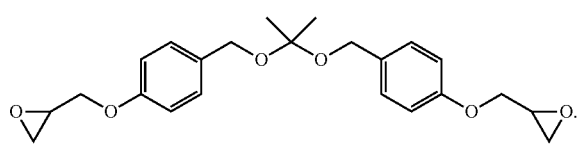 [SMILES: CC(C)(OCc1ccc(OCC2CO2)cc1)OCc1ccc(OCC2CO2)cc1]

8. The process as claimed in claim 7, wherein 4-(2-propen-1-yloxy)-benzenemethanol and the percarboxylic acid compound or hydrogen peroxide are provided in a molar ratio in the range of 0.5 to 2.

9. The process as claimed in claim 7, wherein 4-(2-Oxiranylmethoxyl)-Benzenemethanol and 2-methoxy propene are provided in a molar ratio in the range of 0.01 to 10.

10. The process as claimed in claim 7, wherein the epoxidation of 4-(2-propen-1-yloxy)-benzenemethanol is carried out with hydrogen peroxide to obtain 4-(2-Oxiranyl-methoxyl)-benzenemethanol.

11. The process as claimed in claim 7, wherein the acidic catalyst is p-toluene sulphonic acid.

\* \* \* \* \*